United States Patent
Pan et al.

(10) Patent No.: US 8,731,002 B2
(45) Date of Patent: May 20, 2014

(54) SYNCHRONIZATION, RE-SYNCHRONIZATION, ADDRESSING, AND SERIALIZED SIGNAL PROCESSING FOR DAISY-CHAINED COMMUNICATION DEVICES

(75) Inventors: Yang Pan, Shanghai (CN); Olafur M. Josefsson, Hafnarfjordur (IS); Dongqin Yan, Shanghai (CN); Camille L. C. J. Huin, Andover, MA (US)

(73) Assignee: Invensense, Inc., San Jose, CA (US)

( * ) Notice: Subject to any disclaimer, the term of this patent is extended or adjusted under 35 U.S.C. 154(b) by 16 days.

(21) Appl. No.: 13/426,918

(22) Filed: Mar. 22, 2012

(65) Prior Publication Data

US 2012/0243559 A1    Sep. 27, 2012

Related U.S. Application Data

(60) Provisional application No. 61/467,538, filed on Mar. 25, 2011.

(51) Int. Cl.
*H04J 3/06* (2006.01)

(52) U.S. Cl.
USPC .......................................... 370/503; 709/208

(58) Field of Classification Search
USPC ......... 370/431, 433, 438, 442, 453, 458, 498, 370/503, 509, 520; 709/208, 209
See application file for complete search history.

(56) References Cited

U.S. PATENT DOCUMENTS

| | | | | |
|---|---|---|---|---|
| 4,646,291 A | * | 2/1987 | Perntz et al. | 370/508 |
| 4,755,988 A | * | 7/1988 | Nelson et al. | 370/400 |
| 4,858,223 A | * | 8/1989 | Ansell et al. | 370/250 |
| 5,113,395 A | * | 5/1992 | Murakami et al. | 370/505 |
| 5,834,955 A | * | 11/1998 | Eichfeld et al. | 327/108 |
| 6,072,804 A | | 6/2000 | Beyers, Jr. | |
| 6,091,741 A | * | 7/2000 | Fujiwara et al. | 370/465 |
| 7,042,863 B1 | * | 5/2006 | Morris | 370/338 |
| 8,150,320 B2 | * | 4/2012 | Ratermann et al. | 455/41.2 |
| 2003/0026296 A1 | * | 2/2003 | Ngo | 370/514 |
| 2008/0062897 A1 | * | 3/2008 | Loffink et al. | 370/294 |
| 2008/0069151 A1 | * | 3/2008 | Satoh et al. | 370/503 |
| 2010/0199006 A1 | * | 8/2010 | Takeuchi | 710/107 |
| 2011/0032910 A1 | * | 2/2011 | Aarflot et al. | 370/335 |
| 2012/0076319 A1 | * | 3/2012 | Terwal | 381/86 |

FOREIGN PATENT DOCUMENTS

| | | | |
|---|---|---|---|
| EP | 1326172 A2 | * | 9/2003 |
| JP | 06348649 | * | 12/1994 |

OTHER PUBLICATIONS

ADSP-2136x SHARC Processor Hardware Reference Revision 1.0, Oct. 2005 Part No. 82-000501-01, Analog Devices, pp. 11-1 to 11-8.*

* cited by examiner

*Primary Examiner* — Paul H Masur
*Assistant Examiner* — Michael Phillips
(74) *Attorney, Agent, or Firm* — Maryam Imam; IPxLaw Group LLP

(57) ABSTRACT

A data communication system has a number of communicatively coupled devices, including at least one slave-only device. Techniques for use in the data communication system include techniques for synchronization and re-synchronization of frame and bit clocks, techniques for assigning device address, techniques for dynamically controlling transmit power based on the number of devices, and techniques for serialized signal processing.

23 Claims, 30 Drawing Sheets

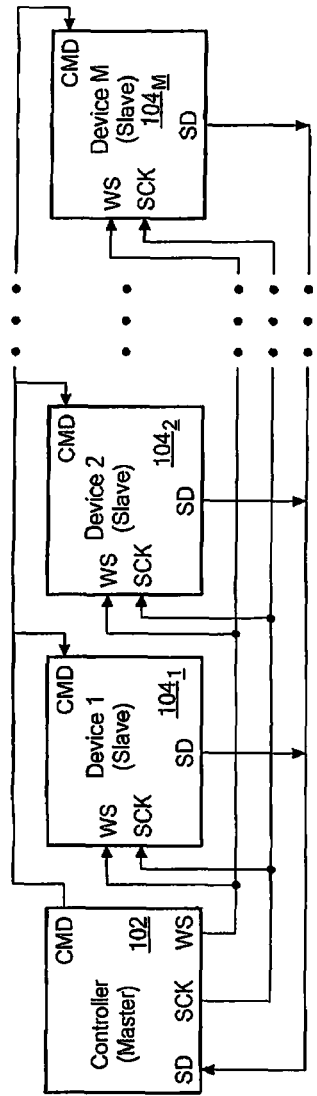
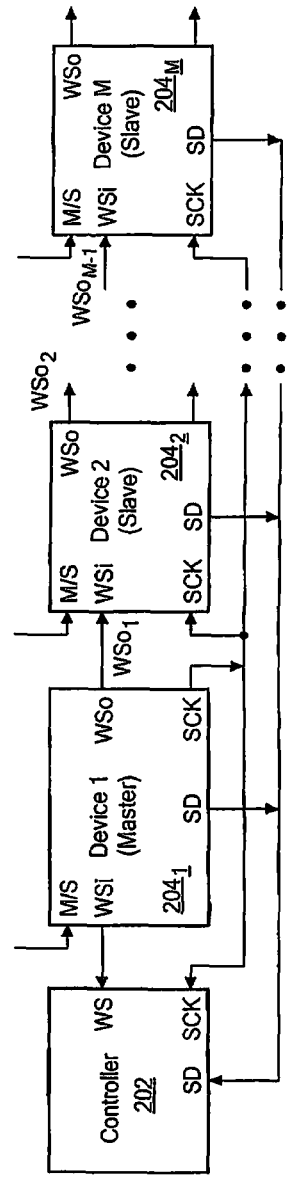
PRIOR ART
FIG. 1
PRIOR ART
FIG. 2

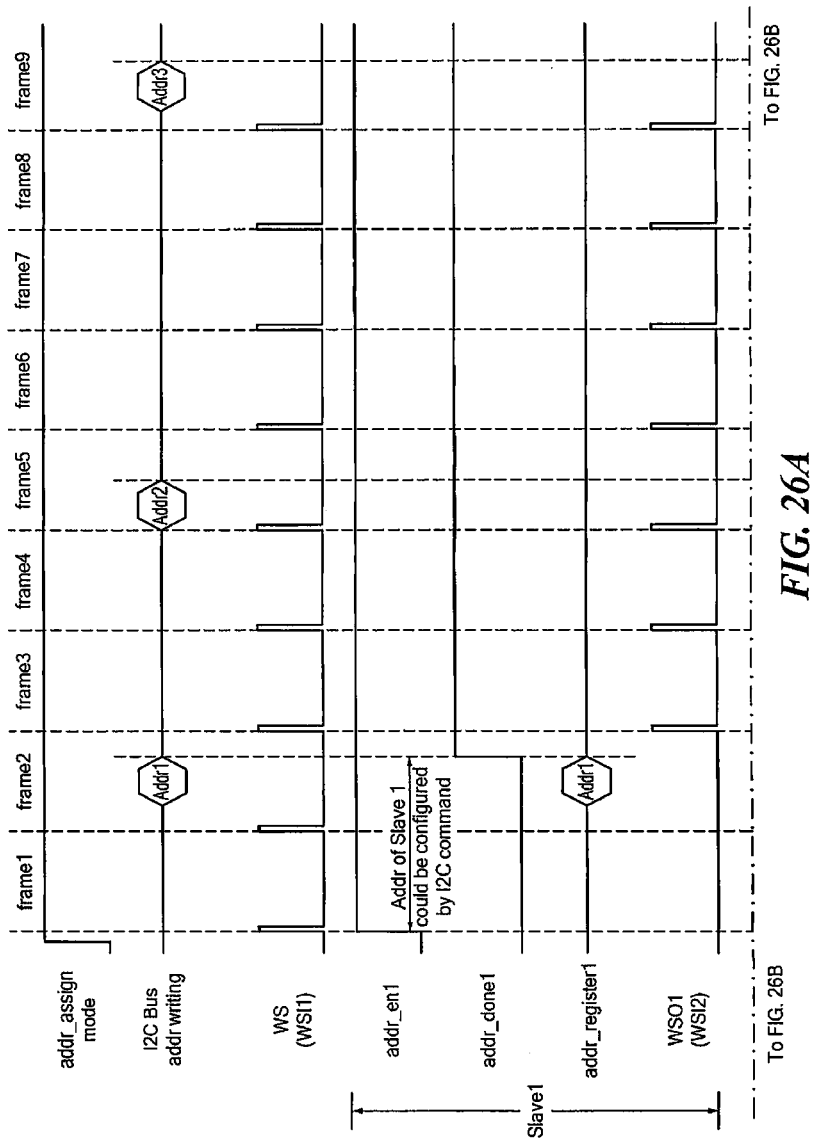

SYNCHRONIZATION, RE-SYNCHRONIZATION, ADDRESSING, AND SERIALIZED SIGNAL PROCESSING FOR DAISY-CHAINED COMMUNICATION DEVICES

CROSS-REFERENCE TO RELATED APPLICATION(S)

This patent application claims the benefit of U.S. Provisional Patent Application No. 61/467,538 filed Mar. 25, 2011, which is hereby incorporated herein by reference in its entirety.

This patent application may be related to commonly-owned U.S. patent application Ser. No. 13/071,836 entitled System, Apparatus, and Method for Time-Division Multiplexed Communication filed on Mar. 25, 2011, which is hereby incorporated herein by reference in its entirety.

FIELD OF THE INVENTION

The present invention relates generally to synchronization, re-synchronization, addressing, and serialized signal processing for daisy-chained communication devices.

BACKGROUND OF THE INVENTION

In certain communication systems, multiple devices transmit data to a controller via a communication channel (e.g., a single-wire bus) that is logically divided into a number of successive time slots, with each time slot having a predetermined number of bits. Each device transmits data to the controller in one or more designated time slots according to a slot allocation scheme, which is fixed in some communication systems and variable in other communication systems. Often times, the devices transmit at fixed regular intervals, and therefore the communication channel is often logically divided into a number of frames with each frame containing a predetermined number of time slots, and each device transmits in its respective time slot(s) in each frame. Thus, for example, a first device may transmit in the first time slot of each frame, a second device may transmit in the second time slot of each frame, and so on. In some systems, devices may transmit in multiple time slots, for example, a first device may transmit in the first and second time slots of each frame, a second device may transmit in the third and fourth time slots of each frame, and so on. In some systems, different devices may transmit in different numbers of time slots, for example, a first device may transmit in the first time slot of each frame, a second device may transmit in the second and third time slots of each frame, a third device may transmit in the fourth time slot of each frame, and so on.

For convenience, N will be used herein to represent the number of time slots per frame, B will be used herein to represent the number of bits per time slot, and M will be used herein to represent the number of devices. A particular embodiment might have, for example, eight 32-bit slots per frame (i.e., N=8, B=32), although the present invention is not limited to any particular values of N and B. The actual data transmitted in each time slot may use all B bits or may use fewer than all B bits (e.g., a 24-bit sample of digital audio may be conveyed in a 32-bit time slot). In various systems, there may be a one-to-one relationship between SCK and bits (e.g., one cycle of SCK for each bit) or there may be other relationships between SCK and bits (e.g., two or more cycles of SCK for each bit).

FIG. 1 schematically shows an exemplary system having a number of devices 1041-104M that transmit data to controller 102 in a TDM fashion, as known in the art. In this exemplary configuration, the controller acts as a bus master and all of the slaves operate as slave devices. The controller 102 provides a clock signal (SCK) and a frame synchronization signal (WS) to all of the devices 104. The controller 102 also sends commands to the devices 104 (e.g., based on a unique address for each device 104) over one or more command lines, for example, to configure the time slot(s) for each device 104 to transmit data over the data line (SD). Based on the SCK and FS signals, and the configuration information provided by the controller 102, each device 104 transmits in one or more designated time slots on the SD line.

FIG. 2 schematically shows another exemplary system having a number of devices 2041-204M that transmit data to controller 202 in a TDM fashion, as known in the art. In this exemplary system (which is similar to configurations shown and described in United States Publication US 2008/0069151 entitled "Variable Time Division Multiplex Transmission System" and filed by Satoh et al., which is hereby incorporated herein by reference in its entirety), each of the devices 204 includes both master operating logic and slave operating logic, and the operational mode of each device 204 may be set, for example, using a hardware pin on the device. In this exemplary embodiment, the first device 2041 is set to operate as the bus master (e.g., via the M/S pin) and provides a clock signal to both the controller 202 and the other devices 204, which are set to operate as slave devices (e.g., via the respective M/S pin). The device 2041 also provides a frame synchronization signal to the controller 202 to mark the start of each frame and provides a delayed synchronization signal to the second device 2042 in the chain to mark the start of that device's time slot(s). Each slave device in the chain, beginning with the second device 2042, provides a delayed frame synchronization signal to the next successive device in the chain.

A similar system is shown and described in Low-Power, Highly-Integrated, Programmable 16-Bit, 26-KSPS, Dual-Channel CODEC (Texas Instruments, Revised April 2005), which is hereby incorporated herein by reference in its entirety. Specifically, FIG. 20 of this document shows a number of devices in a cascade connection, where the first device in the cascade is configured as a master device and both the DSP and the remaining devices in the cascade operate as slaves of the master device. Each slave device is configured to provide a delayed frame synchronization signal to the next successive slave device, and the devices are capable of automatically determining the number of devices in the cascade and automatically assigning addresses to the devices. One issue with such a configuration is that all of the devices carry both master and slave logic, with the master/slave operation of the device selected by the M/S pin. Among other things, the ability of each device to operate as a master or slave adds cost and complexity to each device.

SUMMARY OF EXEMPLARY EMBODIMENTS

In certain embodiments, a time-division multiplexed communication system includes a data line, a controller, and at least one slave device in communication with the controller. The controller includes a clock output for providing a clock signal, a frame sync output for providing a frame sync signal indicating the beginning of each of a number of successive frames, and a data pin coupled to the data line. Each slave-only device includes a clock input coupled to the clock output of the controller for receiving the clock signal, a data pin coupled to the data line, a frame sync input, and a frame sync output. The controller and the at least one slave-only device are interconnected in a chain configuration beginning with the controller, wherein the frame sync input of each slave-only device is coupled to the frame sync output of the previous device in the chain, and wherein the controller provides the frame sync signal on its frame sync output. Each slave-only device is configured to perform an auto-initialization process including monitoring the frame sync input for frame sync signals and after receiving at least two frame sync signals on the frame sync input, generating an inner frame clock based on a plurality of the received frame sync signals and synchronized with the frame sync signal provided on the controller frame sync output, outputting the inner frame clock on the frame sync output, and entering a data passing mode, including generating an internal operational clock based on the inner frame clock.

In various alternative embodiments, generating the inner frame clock may involve determining the number of clock signal cycles in a frame based on the clock signal and the plurality of frame sync signals, and generating the internal operational clock may involve generating the internal operational clock based on the inner frame clock and the number of clock signal cycles in a frame.

In other alternative embodiments, the chain configuration may include a plurality of slave-only devices. In some embodiments, all of the slave-only devices may be configured to access the same number of time slots per frame. In other embodiments, two or more slave-only devices may be configured to access different numbers of time slots per frame. In some embodiments, all of the slave-only devices may be the same type of device. In other embodiments, two or more slave-only devices may be different types of devices. In certain embodiments, at least one of the slave-only devices may include a MEMS microphone device.

In yet other alternative embodiments, each slave-only device may be configured to determine a maximum number of slave-only devices supported by the controller based on the clock signal and the frame sync signal. Furthermore, the data pin of each slave-only device may include a programmable driver, and each slave-only device may be configured to program a power setting of the programmable driver based on the maximum number of slave-only devices supported by the controller. The data pin of each slave-only device may be configured or configurable for transmitting data via the data line or receiving data from the data line.

Additional embodiments include apparatus comprising at least one slave-only device for operation in a time-division multiplexed communication system having a controller in communication with the at least one slave-only device, where each slave-only device includes a clock input for receiving a clock signal, a frame sync input for receiving a frame sync signal indicating the start of each of a number of successive frames, a frame sync output for outputting a delayed frame sync signal, and a slave-only TDM bus interface coupled to the clock input, the frame sync input, and the frame sync output and including a data pin for coupling to a data line. The TDM bus interface is configured to perform an auto-initialization process including monitoring the frame sync input for frame sync signals and after receiving at least two frame sync signals on the frame sync input, generating an inner frame clock based on a plurality of the received frame sync signals and synchronized with a frame sync signal provided on a controller frame sync output, outputting the inner frame clock on the frame sync output, and entering a data passing mode, including generating an internal operational clock based on the inner frame clock.

In various alternative embodiments, the TDM bus interface may be configured to determine the number of clock signal cycles in a frame based on the clock signal and the plurality of frame sync signals, and the TDM bus interface may be further configured to generate the internal operational clock based on the inner frame clock and the number of clock signal cycles in a frame.

In other alternative embodiments, the TDM bus interface may be further configured to determine a maximum number of slave-only devices that can be supported in a chain based on the clock signal and the frame sync signal received on the frame sync input. Furthermore, the data pin may include a programmable driver, and the TDM bus interface may be further configured to program a power setting of the programmable driver based on the maximum number of slave-only devices. The data pin may be configured or configurable for at least one of transmitting data via the data line or receiving data from the data line.

In other alternative embodiments, the apparatus may include a plurality of slave-only devices integrated onto a single chip. In some embodiments, the controller may be integrated with the plurality of slave-only devices onto the single chip. In some embodiments, a digital MEMS microphone may be coupled to the slave-only TDM bus interface.

Additional embodiments include a method for automatically initializing a slave-only device in a time-division multiplexed communication system having a controller in communication with at least one slave-only device, wherein data is transmitted in successive frames, each frame including a predetermined number of time slots. The method involves monitoring, by a TDM interface of the slave-only device, a frame sync input of the slave-only device for frame sync signals; and after receiving at least two frame sync signals on the frame sync input, generating an inner frame clock for the slave-only device based on a plurality of the received frame sync signals and synchronized with a frame sync signal output by the controller, outputting the inner frame clock on a frame sync output of the slave-only device, and entering a data passing mode, including generating an internal operational clock for the slave-only device based on the inner frame clock.

In various alternative embodiments, generating the internal operational clock may involve receiving a clock signal from the controller via a clock input of the slave device, determining the number of clock signal cycles in a frame based on clock signal and the plurality of frame sync signals, and generating the internal operational clock based on the inner frame clock and the number of clock signal cycles in a frame. The method may further involve determining a maximum number of slave-only devices based on the clock signal and the frame sync signal. The slave-only device may include a programmable driver for the data output, and the method may further involve programming the programmable driver based on the maximum number of slave-only devices. The slave-only device may include an analog-to-digital transducer or digital-to-analog transducer, and the method may further involve providing the internal frame clock to the transducer. The transducer may include a microphone that produces digital audio samples.

Additional embodiments may be disclosed and claimed.

BRIEF DESCRIPTION OF THE DRAWINGS

The foregoing and advantages of the invention will be appreciated more fully from the following further description thereof with reference to the accompanying drawings wherein:

FIG. 1 schematically shows an exemplary system having a number of devices that transmit data to a controller in a TDM fashion, as known in the art;

FIG. 2 schematically shows another exemplary system having a number of devices that transmit data to a controller in a TDM fashion, as known in the art;

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

In embodiments of the present invention, a simplified bus arrangement using only three signal lines allows a controller to send TDM data to a number of slave-only devices and/or receive TDM data from a number of slave-only devices without the use of command line(s) and without any of the slave devices having to operate as a bus master or even support a master operating mode. The controller is configured to provide a bit clock signal SCK and a frame synchronization signal WS marking the start of each frame. The SCK signal is passed to all slave devices, while the WS signal is passed to the first device in the chain and is daisy-chained from slave-to-slave, with each slave adding a predetermined amount of delay to the WS signal. Based on the SCK signal and the daisy-chained WS signal, each slave device is able to automatically determine its respective time slot(s) without any special signaling from a master device. Among other things, embodiments of the present invention allow the command line(s) to be eliminated or omitted and also allow the master logic (and M/S pin) to be eliminated or omitted from the slave devices, thereby providing space savings, reduced complexity, and/or reduced power consumption for both the controller and the slave devices, particularly in embodiments where multiple slave devices are incorporated into a single device (e.g., where the same slave device logic block is replicated M times on a wafer or integrated circuit and none of the slave device logic blocks include master logic or command lines). Typically, controller operation is the same regardless of the actual number of slave devices on the data line, greatly simplifying system design and operation.

Figure 3:
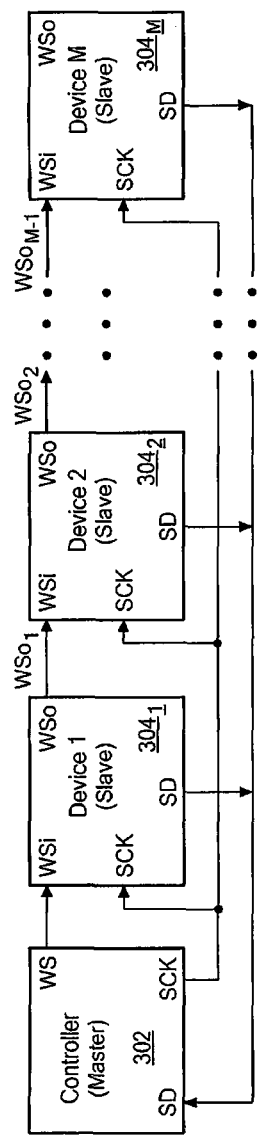
FIG. 3 schematically shows a TDM communication system in accordance with an exemplary embodiment of the present invention.

FIG. 3 schematically shows a TDM communication system in accordance with an exemplary embodiment of the present invention. In this exemplary embodiment, the controller 302 operates as the bus master and provides SCK to all of the slave devices 304 and provides WS to the first slave device 3041, with the WS signal daisy-chained from the WS output (WSO) of each slave to the WS input (WSI) of the next successive slave (note that WSOx is the WSO signal from device x). The controller 302 may be configured to support a predetermined number of time slots per frame (N), and where each slave device is configured to transmit or receive in one time slot per frame, the daisy-chain can have up to N slave devices. In various embodiments, all or less than all of the time slots may be used. For example, the controller 302 may be configured to support up to sixteen slave devices each transmitting in one time slot per frame, and different variants may have from one to sixteen slave devices as necessary or desirable for a particular product or implementation (typically, N is a power of two, although this is not required). The number of slave devices may be fixed (e.g., M slave devices integrated on a single chip or a discrete design with a fixed number of parts) or may be variable (e.g., slave devices may be added or removed over time).

Once enabled, the slave devices typically start dividing the SCK input by a specific dividing ratio to generate an internal operational clock, such as for clocking an analog-to-digital converter (ADC) for producing digital samples of an analog input or clocking a digital-to-analog converter (DAC) to convert digital samples received over the SD line) in a manner discussed below and begin transmitting (or receiving) data on the SD line in a manner discussed below. The slave devices could be enabled in any of a variety of ways such as, for example, upon detecting the clock signal on the SCK line or using a separate chip enable signal (e.g., each slave device 304 may have a chip enable pin with the chip enable pins of the slave devices tied to a common chip enable signal such as a chip enable output pin of the controller 302 allowing for selective enablement of the slave devices or simply tied high to be always enabled).

In embodiments of the present invention, the controller may be any appropriately programmed or configured device, such as a digital signal processor (DSP), microcontroller, integrated circuit, field-programmable gate array, discrete logic, etc. In specific embodiments described below, during normal (data passing) operation, the controller is configured to generate the WS and SCK signals such that fSCK=N*B*fWS (i.e., generating the WS signal every N*B cycles of SCK, e.g., for B=32 clocks SCK cycles per time slot and N=8 time slots per frame, fSCK=256*fWS), although other signal timing may be used in various alternative embodiments. Some types of devices (e.g., certain "off-the-shelf" DSPs and microcontrollers) have built-in programmable timers, and generation of the WS and SCK signals may involve appropriately programming the timers to produce the WS and SCK clocks at the appropriate frequencies. Alternatively, the controller may include custom hardware logic to produce the WS and SCK signals.

Also, in embodiments of the present invention, the slave devices can be any devices that transmit and/or receive digital information, such as, for example, devices that perform analog-to-digital conversion (e.g., digital MEMS microphones and other types of MEMS devices such as gyroscopes, accelerometers, pressure sensors, oscillators, etc., audio codecs, communication/networking transceivers, etc.), devices that perform digital-to-analog conversion (e.g., audio codecs, communication/networking transceivers, etc.), or other types of devices (e.g., microprocessors or digital signal processors), including combinations of different types of devices on the same bus.

In one specific embodiment, the slave devices are digital MEMS microphones, where each digital MEMS microphone provides digitized audio samples to the controller. Compared with other kind of microphones, digital MEMS microphones are generally smaller, cheaper, and more flexible, and generally integrate the microphone, amplifier, analog-to-digital converter (ADC) as well as possibly certain digital signal processing blocks on a single chip. Multiple microphones are often used simultaneously to form an array, which can significantly improve system performance. Such microphone arrays are widely used in many fields, such as telephones, speech recognition systems, and acoustic source locations, to name but a few. The simple TDM interface described herein makes the implementation of such a microphone array simple and low cost.

Figure 4:
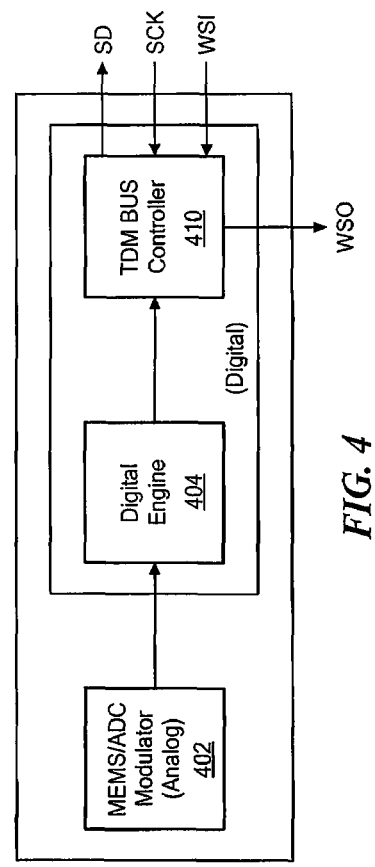
FIG. 4 schematically shows the relevant components of a digital MEMS microphone in accordance with an exemplary embodiment of the present invention.

FIG. 4 schematically shows the relevant components of a digital MEMS device such as a microphone or other device, in accordance with an exemplary embodiment of the present invention. Among other things, the digital MEMS device includes an analog portion including a MEMS device and ADC modulator 402, and also includes a digital portion including a digital engine 404 (e.g., the digital engine for a MEMS microphone might include such things as digital filters and controllers), and a TDM bus controller 410.

TDM Operation

Figure 5:
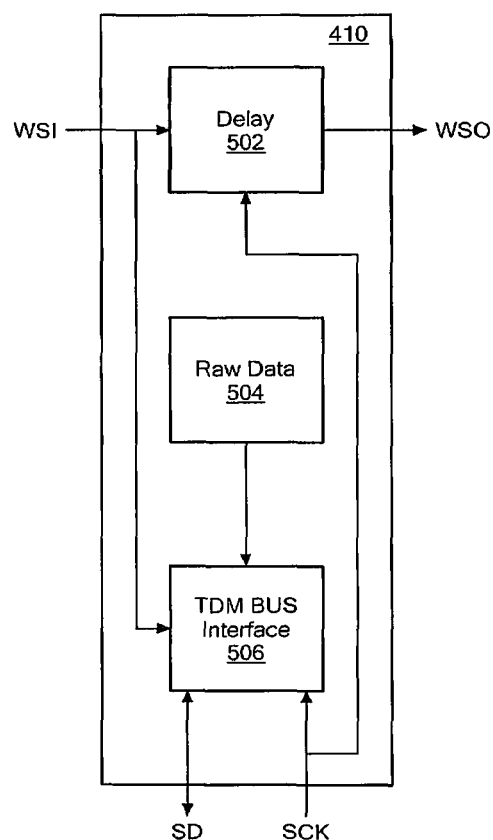
FIG. 5 schematically shows the relevant components of the TDM bus interface in accordance with an exemplary embodiment of the present invention.

FIG. 5 schematically shows the relevant components of the TDM bus controller 410 in accordance with an exemplary embodiment of the present invention. It should be noted that while the TDM bus controller 410 is described here as a component of a digital MEMS device, such a TDM bus controller 410 applies generally to slave devices used in embodiments of the present invention. Among other things, the TDM bus controller 410 includes a delay block 502 that produces the WSO signal, which typically is the WSI signal delayed by the number of time slot intervals allocated to the slave device, where a time slot interval is equal to B bits. In a basic embodiment of the present invention in which there is a one-to-one relationship between SCK and bits and each slave transmits in a single time slot per frame, the delay block 502 typically delays the WSI signal by B cycles of SCK. As mentioned above, one or more slave devices may be configured to transmit or receive in multiple slots, in which case the delay block 502 would delay the WSI signal by the appropriate number of time slot intervals. The TDM bus controller 410 also includes a TDM bus interface 506 that transmits (or receives) raw data 504 via the SD line based on the WSI and SCK signals. For example, upon detecting the WSI signal, the TDM bus interface 506 may transmit raw data onto the SD line in the number of slots designated for the device or, similarly, may receive raw data from the SD line in the number of slots designated for the device.

Figure 6:
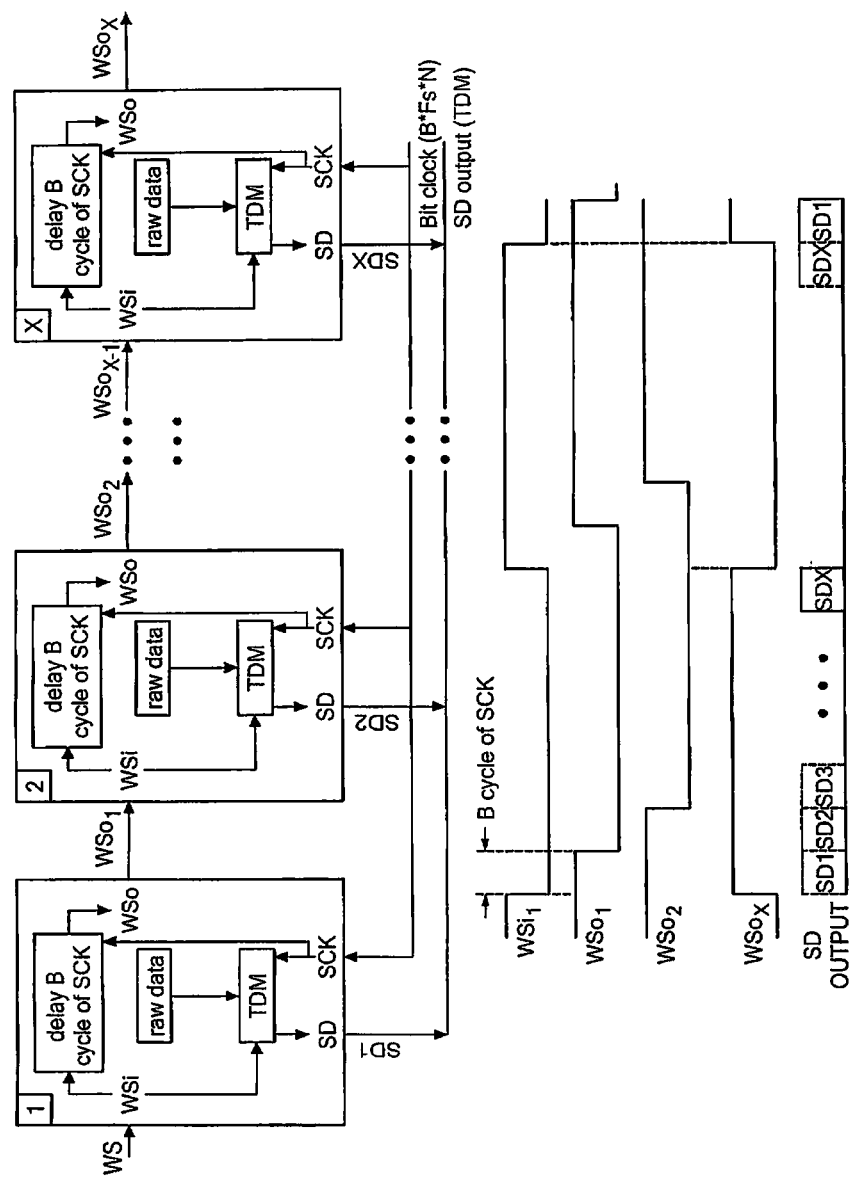
FIG. 6 schematically shows the general operation of the slave devices during a normal operating state, in accordance with an exemplary embodiment of the present invention.

FIG. 6 schematically shows the general operation of the slave devices during a normal operating state, in accordance with an exemplary embodiment of the present invention. During a normal operating state (which may be immediately upon enablement of the slave devices or may be after an initialization phase as discussed below), each slave device accesses the SD data line upon receiving a valid frame signal on its WSI pin, which in this example is a transition from high to low, although other signaling may be used (e.g., a transition from low to high, a signal level lasting a predetermined number of SCK cycles, or a predetermined sequence of transitions). Typically, the WS signal is just used to indicate the beginning of a frame, in which case the duty ratio of the WS signal is not particularly important and could be different for different implementations (a 50% duty cycle is shown). Typically, each slave device receives or transmits in one time slot per frame, e.g., each slave device receives or transmits up to B bits of data upon receiving the valid frame signal on its WSI pin. As mentioned above, one or more slave devices may be configured to utilize multiple slots, so, for example, a slave device configured to transmit or receive in two time slots transmits or receives up to (2*B) bits upon receiving the valid frame signal on its WSI pin. When not transmitting, the SD pin (output) of the slave device is tri-stated (i.e., high impedance state), which allows other slave devices to drive the bus. By daisy-chaining the WS signal and having each slave delay the WS signal by an integral number of time slot intervals (typically one time slot interval but possibly multiple time slot intervals), the slave devices access the SD line in successive time slots without requiring any commands from master device. It should be noted that the WSO signal of the last device in the daisy-chain (which, in this example, would be WSOM, not shown) is an unused signal that does not drive the WSI pin of another slave device.

Figure 7:
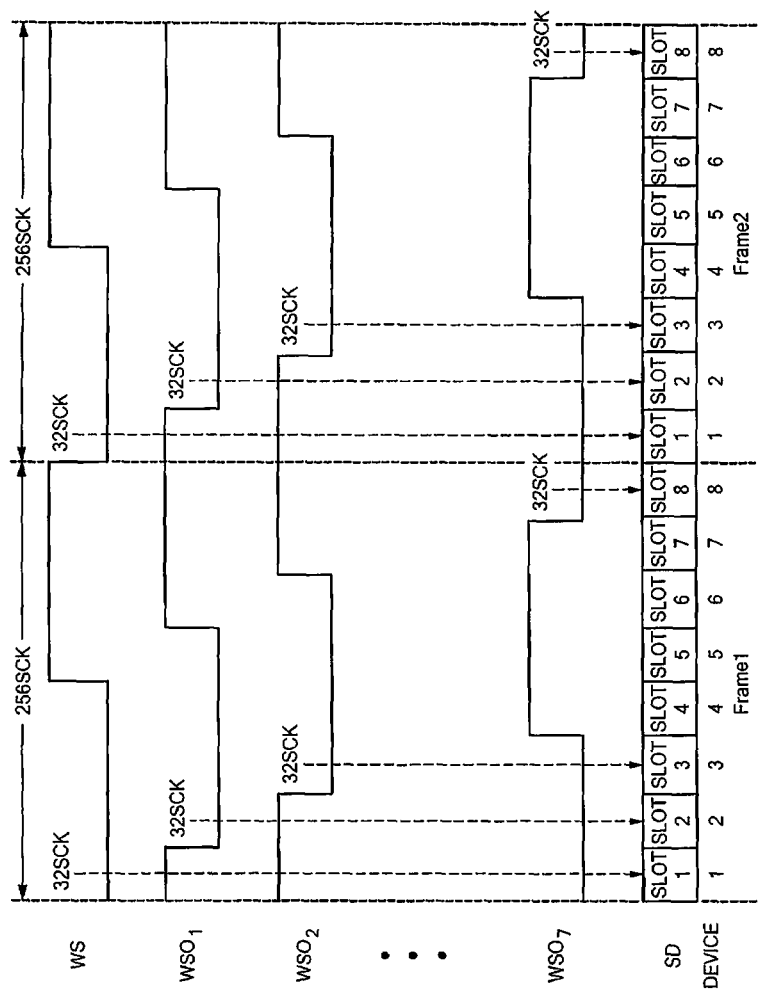
FIG. 7 schematically shows an exemplary timing diagram for an embodiment in which the controller supports up to eight time slots per frame (i.e., N=8) and there are eight slave devices in the chain (i.e., M=8) transmitting in one 32-bit time slot per frame.

FIG. 7 schematically shows an exemplary timing diagram for an embodiment in which the controller supports up to eight time slots per frame (i.e., N=8) and there are eight slave devices in the chain (i.e., M=8) transmitting or receiving in one 32-bit time slot per frame. The controller generates the SCK signal at a frequency of (N*B) or 256 times the frequency of the WS signal (i.e., fSCK=B*N*fWS=256*fWS). By daisy-chaining the WS signal, the eight slave devices transmit respectively in the eight successive time slots per frame.

Figure 8:
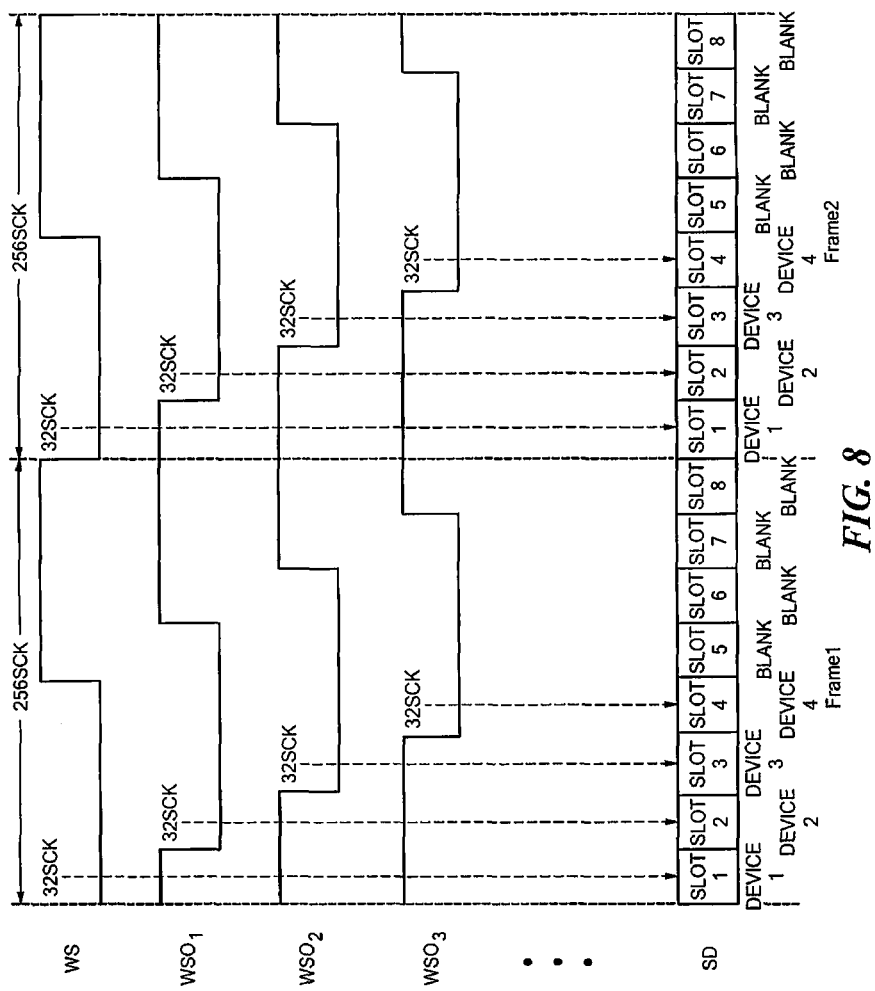
FIG. 8 schematically shows an exemplary timing diagram for an embodiment in which the controller supports up to eight time slots per frame (i.e., N=8) but there are only four slave devices in the chain (i.e., M=4) each transmitting in one 32-bit time slot per frame.

FIG. 8 schematically shows an exemplary timing diagram for an embodiment in which the controller supports up to eight time slots per frame (i.e., N=8) but there are only four slave devices in the chain (i.e., M=4) each transmitting or receiving in one 32-bit time slot per frame. In this example, the controller generates the SCK signal at a frequency of (N*B) or 256 times the frequency of the WS signal (i.e., fSCK=B*N*fWS=256*fWS). By daisy-chaining the WS signal, the four slave devices transmit or receive respectively in the first four successive time slots per frame, with the remaining four time slots per frame unused.

Figure 9:
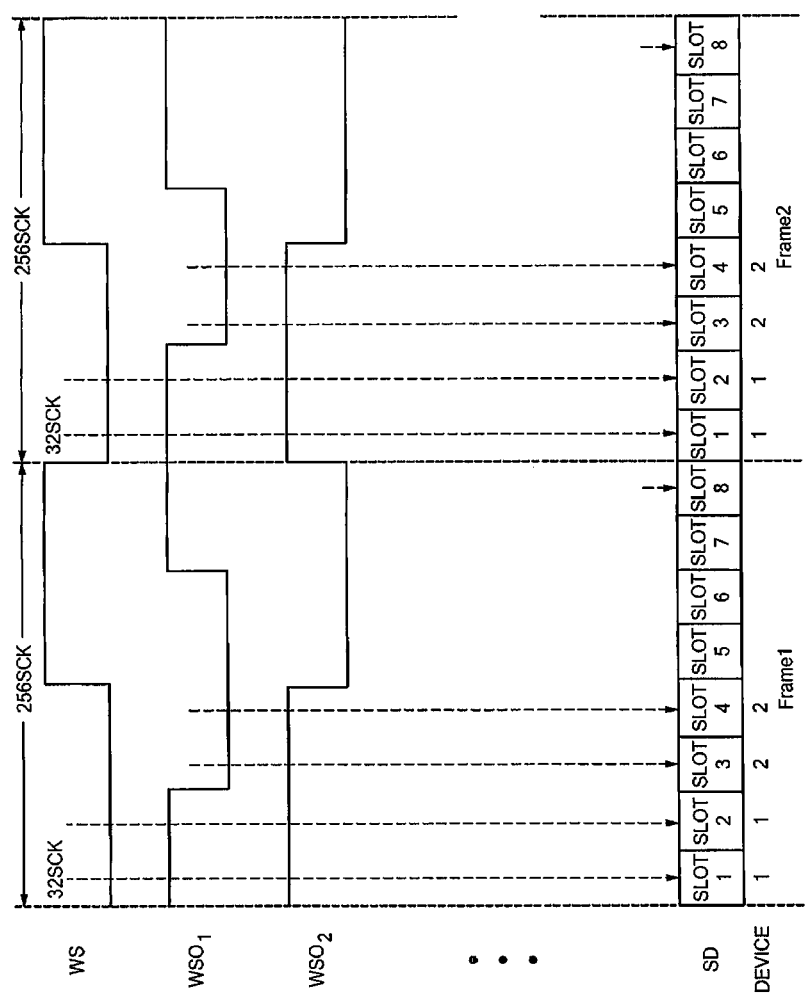
FIG. 9 schematically shows an exemplary timing diagram for an embodiment in which the controller supports up to eight time slots per frame (i.e., N=8) and the slave devices transmit in two successive 32-bit time slots per frame.

FIG. 9 schematically shows an exemplary timing diagram for an embodiment in which the controller supports up to eight time slots per frame (i.e., N=8) and the slave devices transmit or receive in two successive 32-bit time slots per frame (for convenience, timing for two device is shown).

It should be noted that the operation of the controller in generating the WS and SCK signals is the same for the embodiments shown in FIGS. 7-9 even though there are different numbers of slave devices and/or slot assignments.

Figure 10:
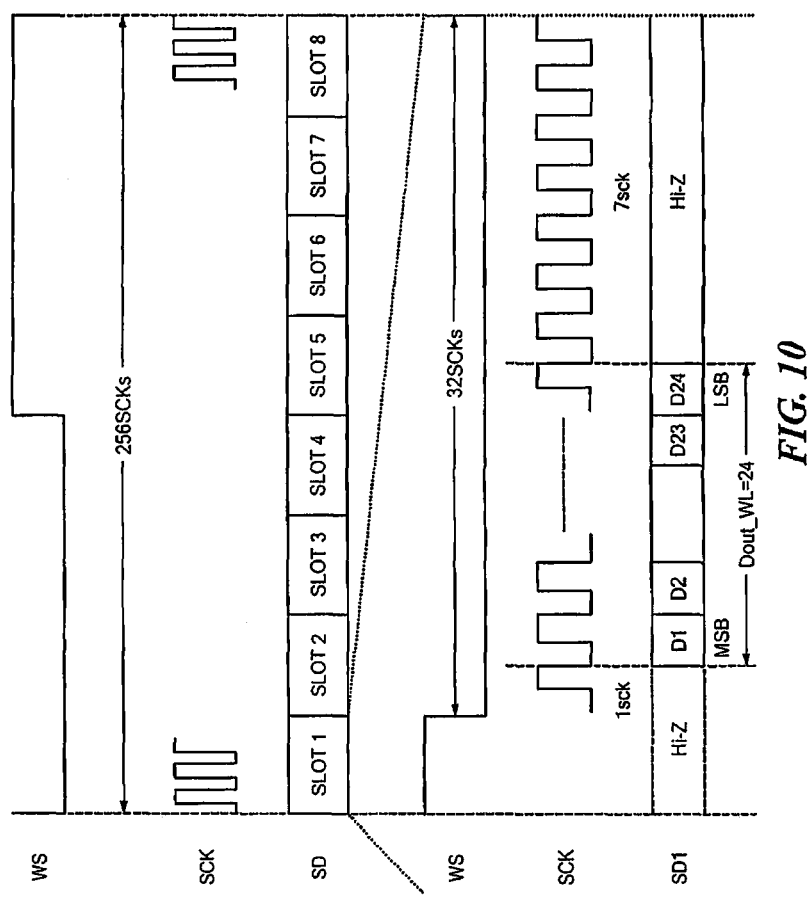
FIG. 10 schematically shows transmission of 24-bit samples in a 32-bit frame, in accordance with an exemplary embodiment of the present invention.

While each time slot on the TDM bus is B bits (e.g., 32 bits in the examples described above), the slave devices may transmit or receive fewer than B bits of raw data per time slot and thus some bits in the time slot may be unused. FIG. 10 schematically shows transmission of 24-bit data samples in a 32-bit time slot, in accordance with an exemplary embodiment of the present invention. In this example, upon detecting the frame synchronization signal on the WSI line, the slave device transmits or receives the 24-bit sample in bits D1-D24 of the time slot, where, in this example, D1 is delayed by one SCK cycle from receipt of the WSI signal and there are seven SCK clock cycles following D24. Transmission of 24-bit data samples may be particularly useful for audio applications such as digital MEMS microphones, where audio is converted into 24-bit samples (or alternatively into a bit stream that can be divided into 24-bit segments). It should be noted that this is but one example of conveying fewer than B bits per B-bit time slot.

Figure 11:
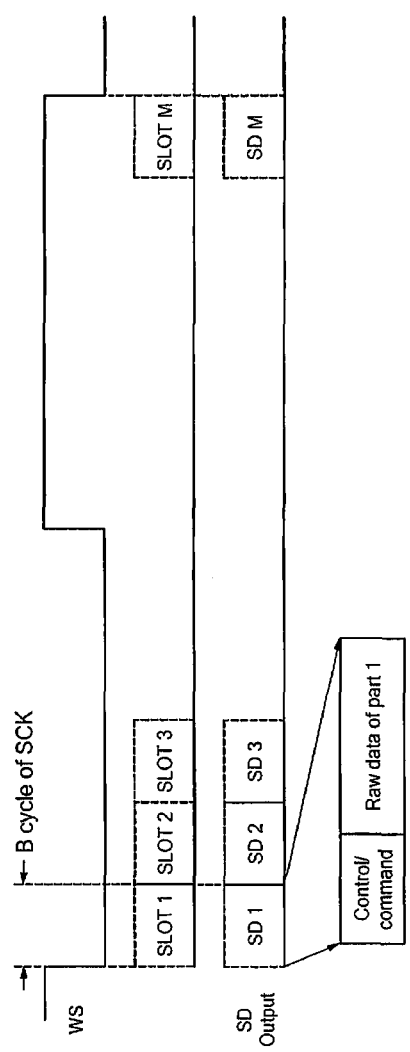
FIG. 11 schematically shows transmission of a command followed by raw data during a time slot, in accordance with an exemplary embodiment of the present invention.

Additionally or alternatively, other information may be conveyed along with the raw data in each time slot. FIG. 11 schematically shows transmission of control/command information followed by raw data during a time slot, in accordance with an exemplary embodiment of the present invention. For example, 8 bits of control/command information may be followed by 24 bits of raw data within a 32-bit time slot. The control/command information may be encoded in any of a variety of ways (e.g., single bit and/or multiple-bit fields) and may convey any of a variety of information (e.g., a slave device identifier or address, an encoding scheme for the raw data, the number of time slots associated with the slave device, power level, operational state, or other information. It should be noted that this is but one example of conveying multiple types of information in a time slot.

Figure 12:
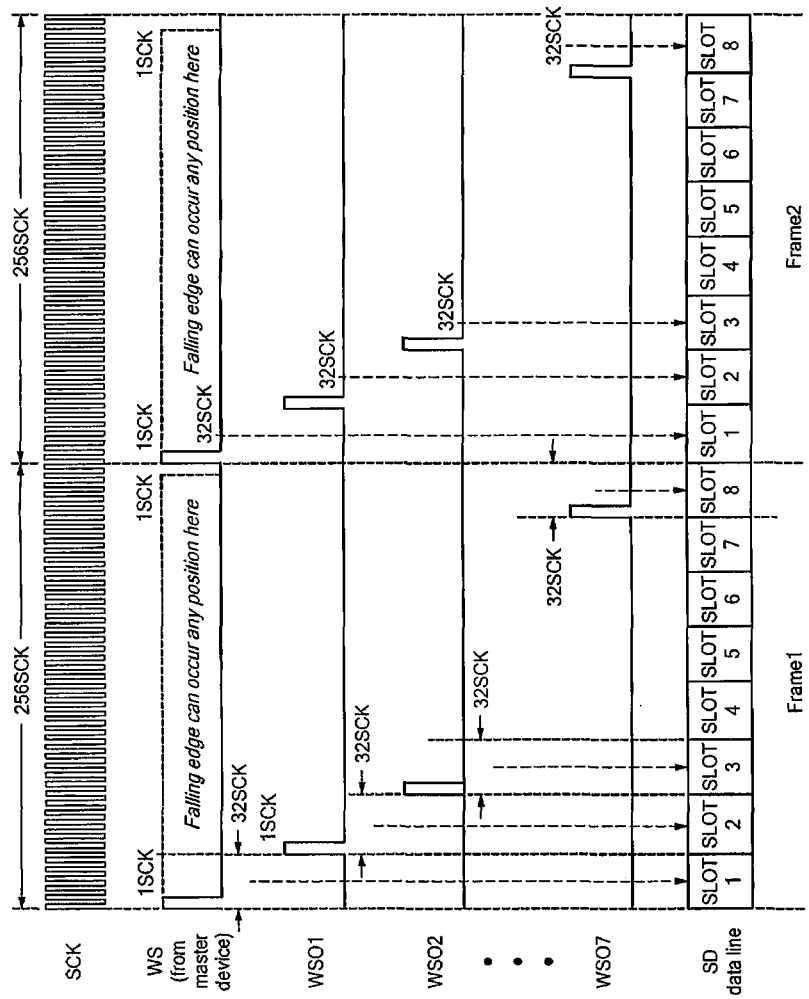
FIG. 12 schematically shows an exemplary timing diagram for an embodiment in which the valid frame signal is a transition from low to high and the duty cycle for the frame synchronization signal is one SCK, in accordance with an exemplary embodiment of the present invention.
Figure 13:
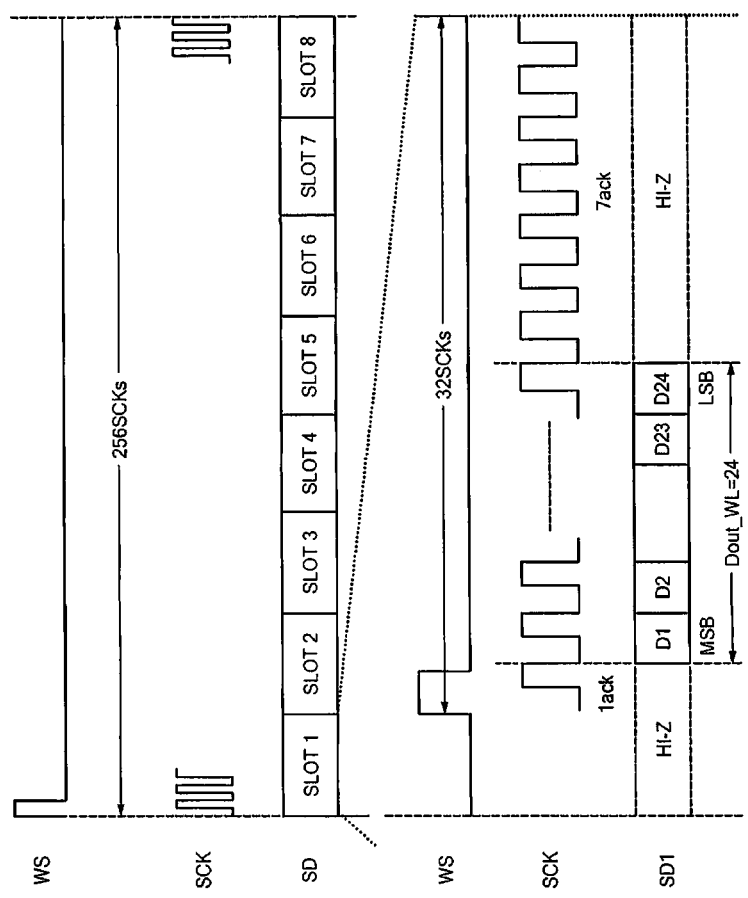
FIG. 13 schematically shows transmission of 24-bit samples in a 32-bit frame as in FIG. 10 using the timing shown in FIG. 12.

In the examples described above, the valid frame signal is represented by a transition from high to low on the WSI line, and the duty cycle of the frame synchronization signal is 50%. However, as mentioned above, other types of frame signals and duty cycles may be used. FIG. 12 schematically shows an exemplary timing diagram for an embodiment in which the valid frame signal is a transition from low to high and the duty cycle for the frame synchronization signal is one SCK, in accordance with an exemplary embodiment of the present invention. FIG. 13 schematically shows transmission of 24-bit samples in a 32-bit frame as in FIG. 10 using the timing shown in FIG. 12.

It should be noted that the TDM interface may be implemented to support bi-directional communication between the controller and the slave device(s). For example, outbound information from the controller to the slave device(s) may be transmitted in certain designated frames or even slots and inbound information from the slave device(s) to the controller may be transmitted in other designated frames or slots. For example, the devices may operate in an outbound communication mode during certain frames (e.g., during an initialization phase during which the controller may configure/program the slave devices, such as with an address and/or operational information) and operate in an inbound communication mode during other frames (e.g., after an initialization phase). Additionally or alternatively, the devices may alternate between outbound and inbound communication modes on a frame-by-frame or other basis.

As mentioned above and discussed more fully below, the slave-only devices can be assigned addresses in any of a variety of ways (e.g., hard-coded, assigned by the controller, determined automatically by the slave-only devices, etc.), and such addressing can be used to allow for a variety of unicast, multicast, and/or broadcast communications between the controller and the slave device(s) and even between slave devices, such as for configuring the slave-only devices, sending command/control information to the slave-only devices, obtaining status information from the slave-only devices, or other types of communications.

Generation of an Internal Operational Clock

As discussed above, once enabled, the slave devices typically would start dividing the SCK input by a specific dividing ratio to generate an internal operational clock, such as for clocking an ADC to produce digital samples of an analog input. Often, the internal operational clock operates with a fixed relationship to the frame synchronization signal (e.g., 64*fWS), and in the exemplary embodiments described above, the SCK signal is scaled according to the maximum number of time slots per frame N. In some embodiments, the number of slots per frame N may be built into the system (e.g., N=8) such that the slave devices can be configured with a fixed dividing ratio (e.g., for fSCK=256*fWS with eight 32-bit time slots per frame, the dividing ratio could be fixed at R=256/64=4). Alternatively, the slave devices can determine the dividing ratio dynamically, e.g., by counting the number of SCK cycles per frame (COUNT) and computing the dividing ratio R based on COUNT (e.g., R=COUNT/64 for this particular example). Typically, such a determination would be done during an initialization phase before the slave device begins transmitting or receiving raw data via the SD line.

Figure 14:
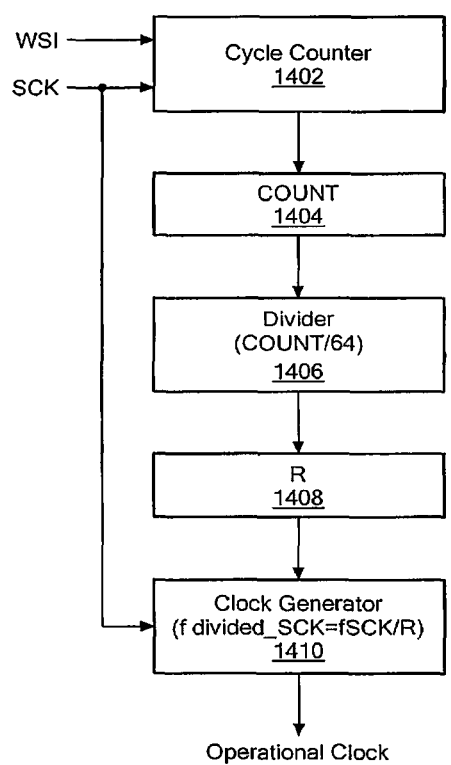
FIG. 14 schematically shows relevant logic blocks for circuitry that dynamically generates the internal operational clock, in accordance with an exemplary embodiment of the present invention.

FIG. 14 schematically shows relevant logic blocks for circuitry that dynamically generates the internal operational clock, in accordance with an exemplary embodiment of the present invention. Among other things, the logic includes a cycle counter 1402 that counts the number of SCK cycles in a frame, a first storage register 1404 (which may be referred to herein as the SCK_num register) for storing the value COUNT, a first divider 1406 that calculates the value R based on COUNT (in this example, R=COUNT/64), a second storage register 1408 for storing the value R, and a divided clock generator 1410 that produces the internal operational clock at a frequency fDIVIDED_SCK=fSCK/R. It should be noted that this is but one example of generating an internal operational clock.

Figure 15:
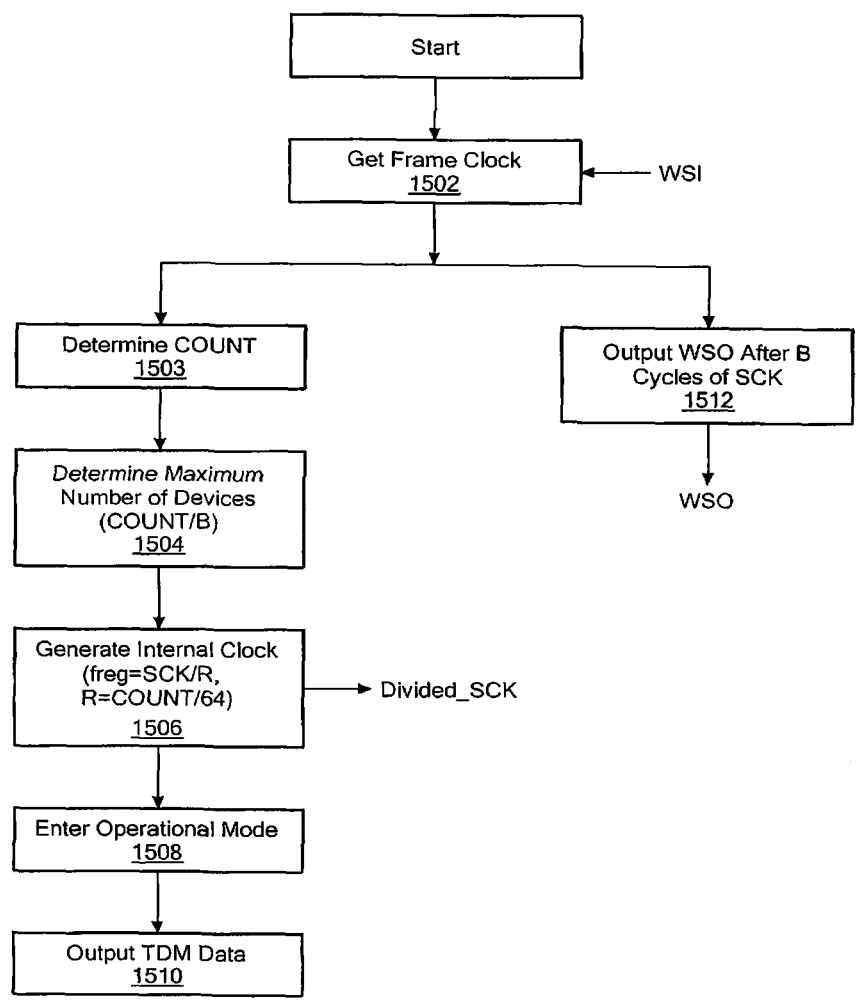
FIG. 15 is a flow chart for TDM operation, in accordance with an exemplary embodiment of the present invention.

FIG. 15 is a flow chart for TDM operation, in accordance with an exemplary embodiment of the present invention. Upon receiving the frame clock in block 1502, the logic enters an initialization stage at block 1503 and also begins outputting the WS signal after B (32 in this example) cycles of SCK in block 1512. In block 1503, the logic counts the number of SCK cycles in a frame to determine COUNT. In block 1504, the logic optionally determines the maximum number of devices that can be in the daisy-chain (in this example, N=COUNT/32 and may be used for power adjustment or other things as discussed below). In block 1506, the logic generates an internal system clock at a frequency fDIVIDED_SCK=fSCK/R (in this example, R=COUNT/64=4 and fDIVIDED_SCK=fSCK/4=64*fWS). The logic then proceeds to block 1508, where the device enters into normal operational mode, for example, generating data based on the internal operational clock and, in block 1510, outputting the data onto the SD line in the designated time slot(s).

Figure 16:
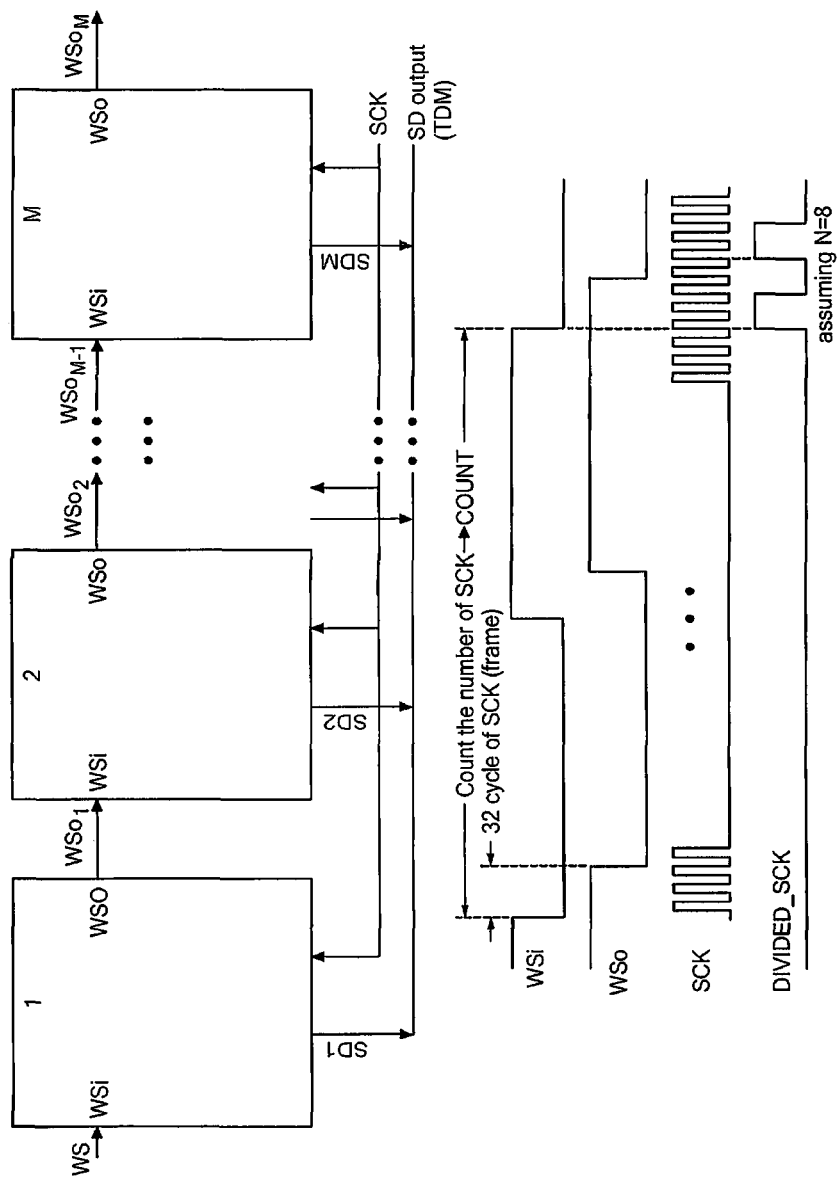
FIG. 16 schematically shows a timing diagram for operation according to the process of FIG. 15, in accordance with an exemplary embodiment of the present invention.

FIG. 16 schematically shows a timing diagram for operation according to the process of FIG. 15, in accordance with an exemplary embodiment of the present invention.

Power Adjustment Based on Maximum Number of Devices

Using a similar technique to the one described above for determining R, each slave device can determine the number of time slots per frame N (e.g., N=COUNT/B) and from this determination can determine the maximum number of slave devices that can be coupled to the SD line. For example, if each slave device is capable of transmitting in one time slot per frame, then the maximum number of slave devices typically would be N; if each slave device is configured to transmit in two time slots per frame, then the maximum number of slave devices typically would be N/2; etc.

Among other things, such determination of the maximum number of slave devices can be used to set the SD pin driver strength of each slave device in proportion to the maximum number of slave devices. Generally speaking, the more slave devices connected for transmission on the SD line, the longer the SD line and the larger the load. Each slave device may be configured with a programmable/configurable SD pin driver, and the SD pin driver strength may be set based on the maximum number of slave devices that can be connected to the SD line (even if that number of slave device is not actually connected to the SD line). Among other things, such dynamic power control may save battery power in devices that support a small number of slave devices. Typically, such dynamic power control would be done during an initialization phase before the slave device begins transmitting raw data onto the SD line.

Figure 17:
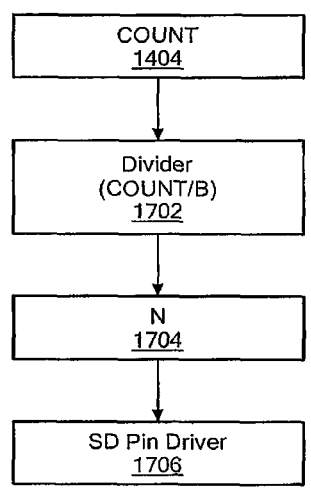
FIG. 17 schematically shows relevant logic blocks for circuitry that dynamically sets the SD pin power strength, in accordance with an exemplary embodiment of the present invention.

FIG. 17 schematically shows relevant logic blocks for circuitry that dynamically sets the SD pin power strength, in accordance with an exemplary embodiment of the present invention. Among other things, the logic includes a divider 1702 that calculated the value N based on the value of COUNT from register 1404 and the value B, a register 1704 for storing the value N, and a programmable SD pin driver 1706 that sets the SD pin driver strength based on the value of N. As mentioned above, the value N may not represent the maximum number of slave devices that can be connected to the SD line, and the logic shown in FIG. 17 can be modified accordingly (e.g., if each slave device transmits in two time slots, N=COUNT/2B).

Slave Device Synchronization and Re-Synchronization

In some cases, it is necessary or desirable to synchronize all of the slave devices, and, in particular, the internal operational clocks of the slave devices. For example, when the slave devices are digital MEMS microphones, it may be necessary or desirable for all of the microphones to sample audio synchronously at the same sampling frequency and further to transmit the synchronized audio samples back to the controller within the same frame, i.e., it may be necessary or desirable for the internal operational clocks of the slave devices to be synchronized with one another and also relative to the frame clock from the controller (e.g., have the same delay time with respect to the external frame clock). In this way, even though the slave devices transmit the synchronized audio sample data to the controller at different times (i.e., in different time slots), the synchronized audio samples arrive in one frame at the controller, which can then process the synchronized audio sample data. Such synchronized audio sampling is suitable for any of a variety of advanced signal processing, such as, for example, beamforming, noise reduction/cancellation, or acoustic source localization, to name but a few.

The following is an example of an auto-initialization process for digital MEMS microphones, although it can be applied generically to other types of devices.

Figure 18A:
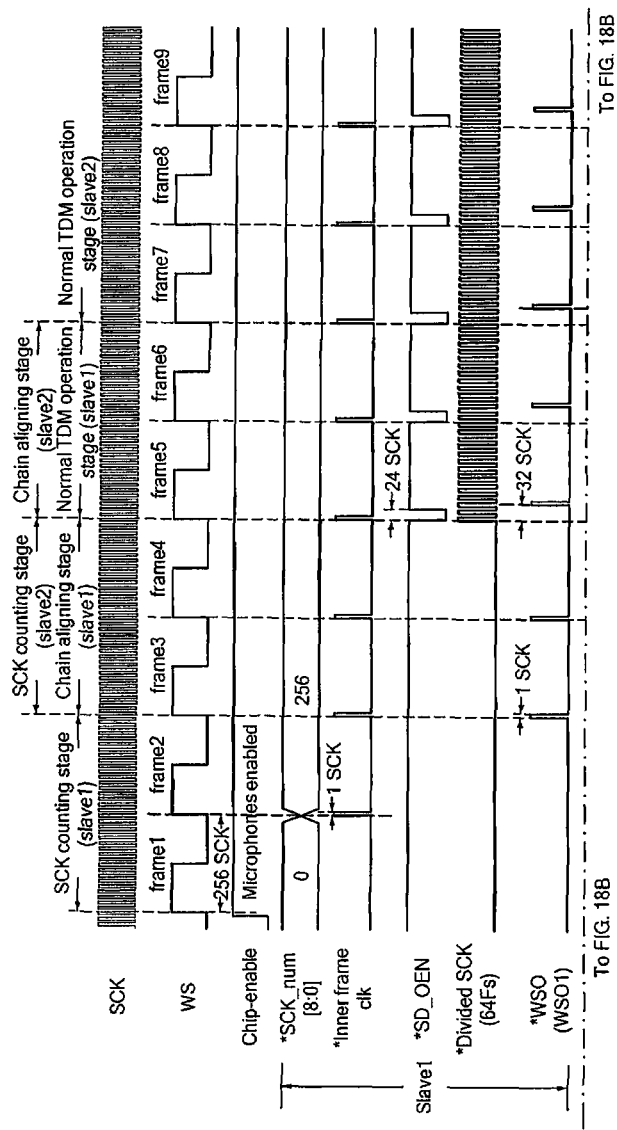
FIG. 18 schematically shows a timing diagram for an auto-initialization stage for synchronizing the microphones, in accordance with an exemplary embodiment of the present invention.
Figure 18B:
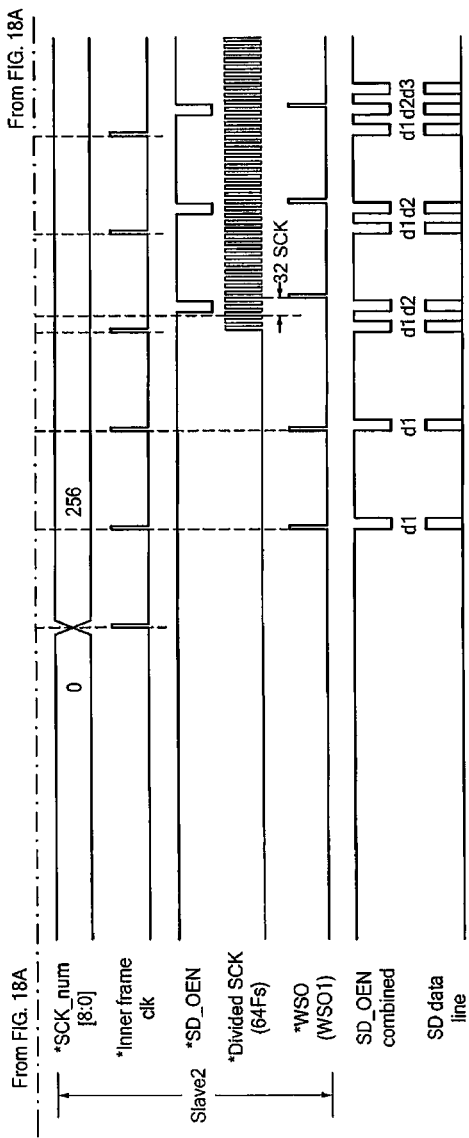

FIG. 18 schematically shows a timing diagram for an auto-initialization stage for synchronizing the microphones, in accordance with an exemplary embodiment of the present invention. Even though microphones are used in this example, it should be noted that such auto-initialization can be used for other types of devices generally. For convenience and simplicity, only the sequence of the first two microphones in the daisy chain (referred to as Slave 1 and Slave 2) is shown, although the sequence for additional microphones will be apparent. Note that the signals marked with an asterisk (*) are signals that are generated inside the microphones. The SD_OEN signal is an internal signal that when high causes the SD pin to be tri-stated (i.e., high impedance) and when low causes data to be output on the SD pin.

As discussed above, the controller outputs WS and SCK and reads and/or writes data through the SD data line. The WS signal is just used to indicate the beginning of a frame (in this example, on the rising edge). When the chip-enable signal is changed to high, the microphones in the chain begin to work and the first microphone begins to receive the WS signal from the controller through its WSI pin.

Figure 19:
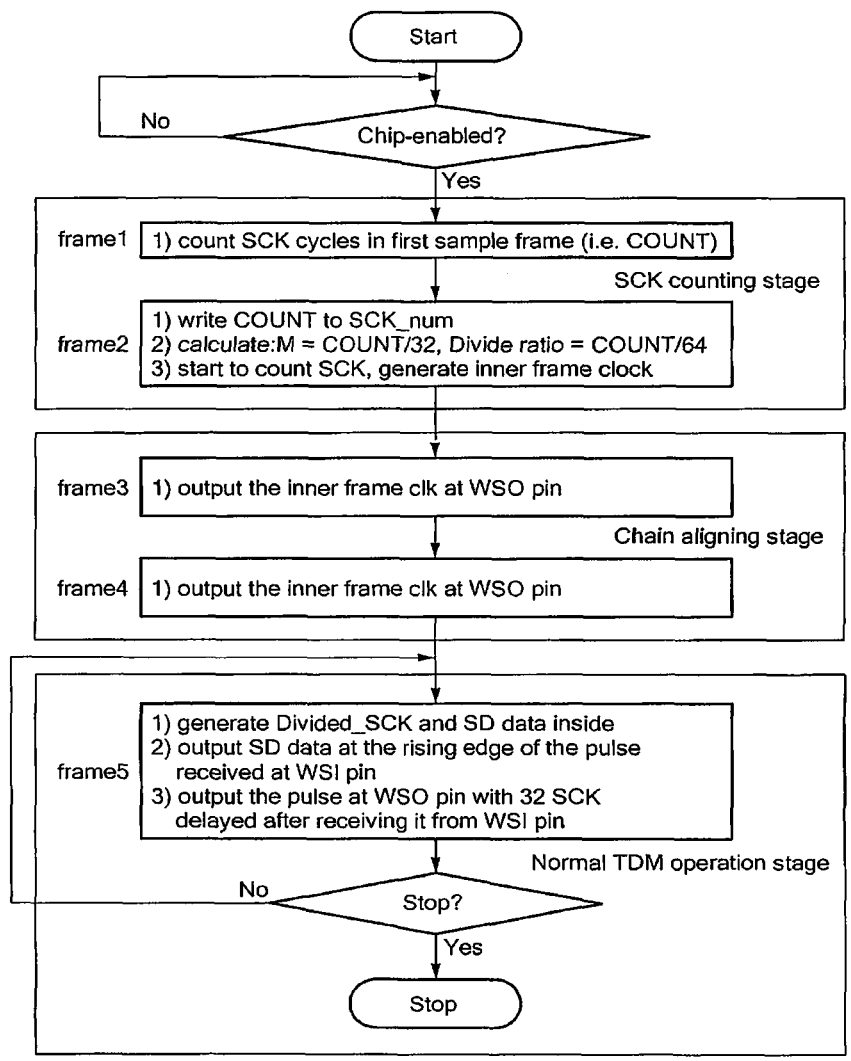
FIG. 19 is a flow chart of the five-frame auto-initialization method, in accordance with an exemplary embodiment of the present invention.

In this example, initialization of each microphone takes five sample frames (i.e., each microphone starts to output SD data from the fifth frame), which is divided into three stages: a SCK counting stage, a chain-aligning stage, and a normal TDM operation stage. FIG. 19 is a flow chart of the five-frame auto-initialization method, in accordance with an exemplary embodiment of the present invention.

SCK Counting Stage

This stage contains the first two frames. After being enabled, the Slave 1 device gets the rising edge of the WS signal from the controller and enters into SCK counting stage (other slaves are still waiting at this point). During frame 1, Slave 1 just counts the number of SCK cycles (COUNT) within a sample frame. During frame 2, several operations are performed:

1) storing COUNT into the register SCK_num at the rising edge of the frame 2 (for the microphone embodiment described herein, this number should be a multiple of 64; it is 256 in this specific example);

2) with COUNT stored in SCK_num, calculating the maximum number of devices in the array M (in this example, M=COUNT/32), and also calculating the divide ratio (R) between SCK and Divided_SCK (where Divided_SCK is the inner operational clock, which, in this example, is fixed to be fDivided_SCK=fSCK/R, where R=COUNT/64; and 3) from the start of frame 2, counting SCK cycles to generate the inner frame clock, which contains the same number of SCK cycles as the WS input, i.e., it has the same frequency of the frame clock from the controller and also aligns with the frame clock from the controller. In this stage, no pulse would be output on the WSO pin and the SD pin is in the high-impedance state (i.e., SD_OEN is high).

Additionally, as mentioned above, since the number of microphone in the chain could be estimated in this stage (e.g., indicated by the calculated value of N), the driving strength of the SD pin could be adjusted according to the value N automatically.

Chain-Aligning Stage

This stage also contains two frames (the third and fourth frames), during which the inner frame clock (a specific pulse, in this example, a pulse of one SCK duration) is output on the WSO pin. This signal is used as the frame signal for the next microphone in the chain, prompting the next microphone to perform the SCK counting stage and chain-aligning stage and passing along the inner frame clock to the next successive microphone, and so on. In this way, all the microphones in the chain are trigged and go through the SCK counting stage as well as the chain-aligning stage.

It should be noted that the two pulses outputted by each microphone to the WSO pin during its respective chain-aligning stage have the same rising edge position as the original frame clock from the controller (due to the feature of the inner frame clock), and this feature will be propagated down along the daisy chain to make all slave internal operations align with the frame clock from the controller, e.g., for synchronized audio sampling.

Normal TDM Operation Stage

After each microphone in the TDM chain goes through the two stages above (i.e., the SCK counting and chain-aligning stages), the microphone enters the normal operation stage during which data is output onto the SD pin during its designated time slot. In this stage, starting from the fifth frame (i.e., the fourth inner frame clock), the divided SCK (64*Fs) clock is generated internally by dividing SCK with the ratio generated by the SCK counting stage. Using this clock, the MEMS microphone begins to generate the expected audio data and drive its data during its time slot onto the SD data line. In the example of a TDM daisy chain containing eight microphones, as shown in FIGS. 12 and 13, each timeslot lasts 32 cycles of SCK, and each microphone outputs 24-bit audio data within each sample frame during its assigned time slot. As shown in FIG. 13, in this particular example, the microphone starts to output its 24-bits of data at the first falling edge of SCK after the rising edge of the pulse at the WSI pin, and the SD pin is kept in a high impedance state (Hi-Z) until it needs to transmit data in the next frame.

At the same time, to make the next microphone output its SD data in the next time slot (32 SCK), a pulse is output at the WSO pin, which is 32 SCK delayed from the received pulse at the WSI pin.

In this way, the WSI signal of a particular slave (i) would always be 32 SCK later than the WSI signal of slave (i-1) and, as a result, the data of each slave device would be allocated in corresponding time slots without overlapping as shown in FIG. 12. Hence, the TDM system would be fully operational (i.e., all microphones transmitting data to the controller) after all the slave devices enter normal TDM operation stage (taking 2N+3 frames, where N is the number of slave devices).

Figure 20:
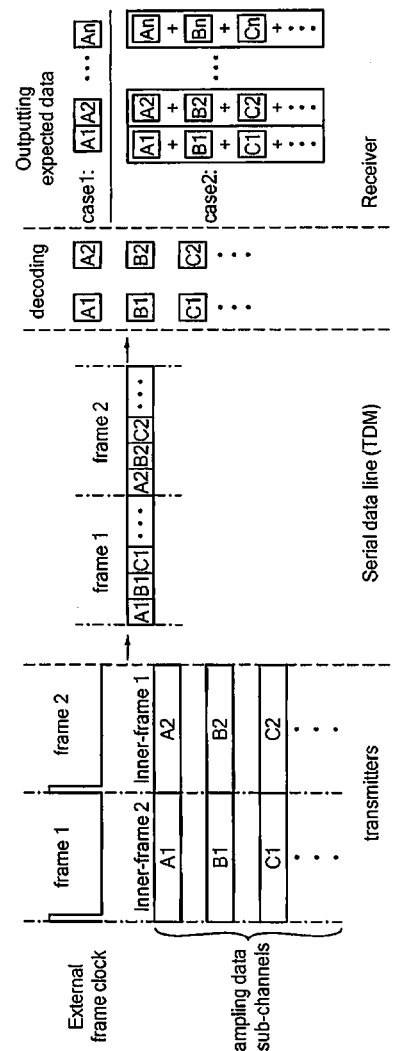
FIG. 20 schematically shows a TDM operating situation in which the slave devices are sampling and transmitting in a synchronized manner, in accordance with an exemplary embodiment of the present invention.

FIG. 20 schematically shows a TDM operating situation in which the slave devices are sampling and transmitting in a synchronized manner, in accordance with an exemplary embodiment of the present invention.

The exemplary embodiment described above can be summarized as follows:

during a first frame interval relative to a frame sync signal received on the frame sync input, count the number of clock signal cycles in a frame;

during a second frame interval relative to a frame sync signal received on the frame sync input, generate an inner frame clock based on the frame sync input signal;

during a third frame interval relative to a frame sync signal received on the frame sync input, output the inner frame clock on the frame sync output;

during a fourth frame interval relative to a frame sync signal received on the frame sync input, output the inner frame clock on the frame sync output; and during a fifth frame interval relative to a frame sync signal received on the frame sync input, enter a data passing mode in which a delayed frame sync signal is provided to the frame sync output and an internal operational clock is generated based on the clock signal and the count obtained during the first frame interval.

It should be noted that these steps do not necessarily need to be performed in this way or in this order. For example, counting the number of clock signal cycles in frame may be done during a different frame and perhaps in some embodiments may be omitted altogether (e.g., if the COUNT is hardwired or configured in another way). Some or all of the steps may be performed or repeated over a number of frames. The steps do not necessarily have to be performed in consecutive frames. Thus, in this description, the designators "first," "second," "third," "fourth," and "fifth" are designate different frames, not necessarily the order of the frames and not necessarily that the frames are consecutive.

Quick Re-Synchronization

Figure 21:
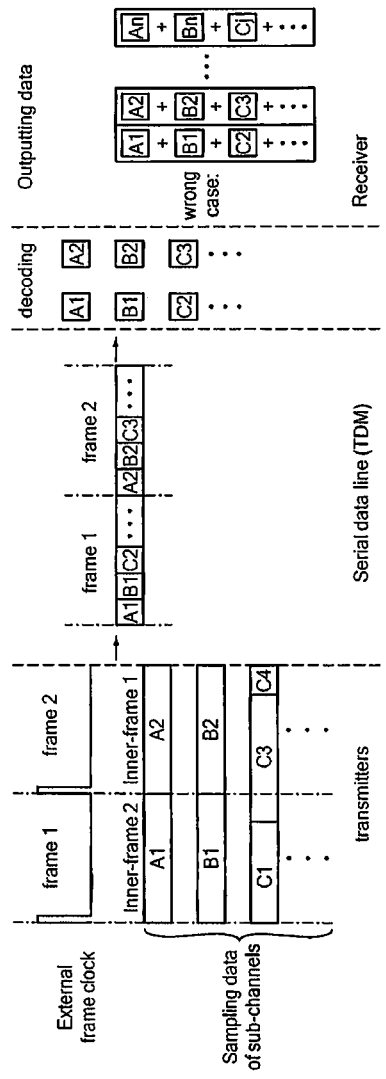
FIG. 21 schematically shows, as an example, a TDM operating situation in which one of the slave devices has lost synchronization from the operation shown in FIG. 20.

From time to time, slave device synchronization may be unexpectedly lost, for example, due to an operational or clock error or if the controller stops the frame clock or serial clock when it does not want to receive data from the slave devices. FIG. 21 schematically shows, as an example, a TDM operating situation in which one of the slave devices has lost synchronization from the operation shown in FIG. 20.

Thus, it may be necessary or desirable to re-synchronize the slave devices from time to time, which may be done, for example, upon detecting a loss of synchronization or perhaps periodically whether or not synchronization was lost.

Figure 22:
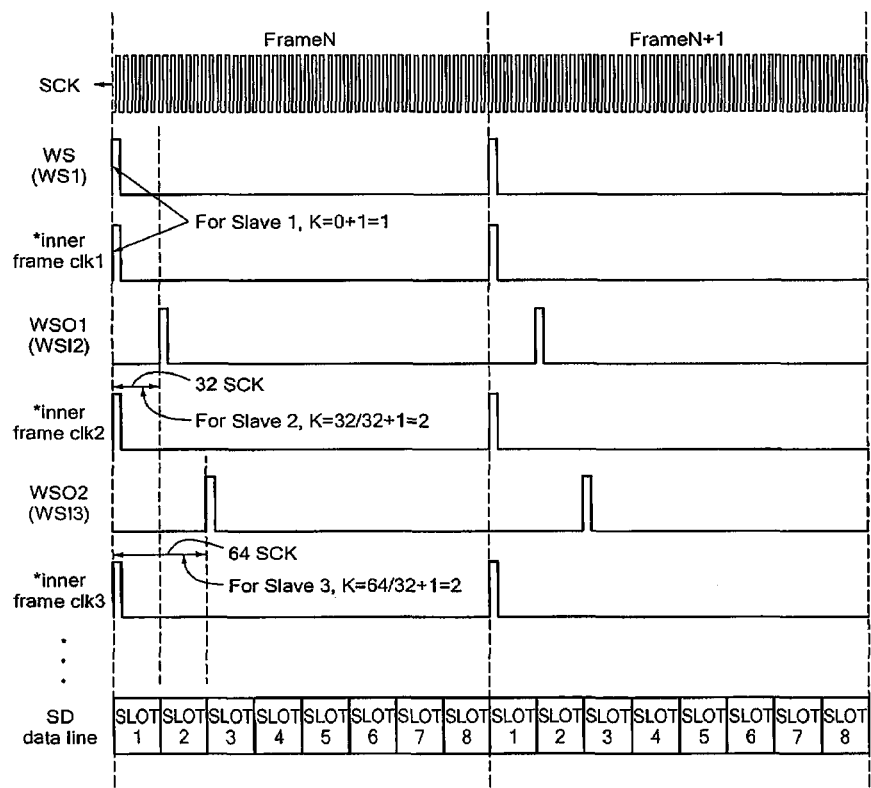
FIG. 22 schematically shows a timing diagram by which the slave devices can automatically determine their respective position in the daisy-chain, in accordance with an exemplary embodiment of the present invention.

Rather than forcing the slave devices to go through the full initialization process described above (e.g., by re-booting the slave devices and performing the full initialization, which is one way to resynchronize the slave devices), certain embodiments of the present invention perform a simple re-synchronization process that essentially re-synchronized the slave devices immediately with very little hardware overhead. To realize the proposed re-synchronization method, each slave device in the chain determines its location in the chain and stores its location information in a memory, typically during initialization. As discussed above, during normal TDM operation, each slave device typically receives a frame clock with B (e.g., 32) cycles of SCK delay from the previous device, while the first slave device in the chain receives the frame clock (WSI) directly from the controller. On the other hand, using the synchronization mechanism described above, each slave device may generate an inner frame clock synchronized relative to the frame clock from the controller (e.g., aligned with the frame clock from the controller). With these two frame clocks, i.e., the WSI input and the internally generated frame clock, as well as SCK, the location (K) of each slave device can then be calculated as K=N/32+1, where n is the number of SCK cycles counted from the starting edge of the inner frame clock to the frame clock received at WSI pin, as shown schematically in FIG. 22.

In order to re-synchronize a particular slave device, the controller sends a re-synchronization signal to the slave device, e.g., over the SD line, via a separate communication interface (not shown) such as hardware "re-sync" pin or a separate command interface (e.g., an I2C bus or other command interface interconnecting the controller and slave devices). Upon receiving the re-synchronization signal, the slave device uses the frame sync signal received on its WSI pin as a reference from which to re-synchronize the internal operational clock, specifically by determining the amount of delay needed from the frame sync signal to the next synchronized internal operational clock signal. In the exemplary embodiment described above in which the internal operational clock is synchronized with the WS output of the controller and the frame sync signal for a particular slave device K is nominally delayed from the internal operational clock by (K−1)*B cycles of SCK (e.g., 0 cycles for device K=1, 32 cycles for device K=2, etc.), the internal operational clock of the slave device may be re-synchronized by restarting the internal operational clock after (N−K+1)*B cycles of SCK delayed from the frame clock received at the WSI pin (implementationally, upon receiving the re-synchronization signal, the slave device may stop generating Divided_SCK and generate a inner frame pulse after (N−K+1)×B cycles of SCK delayed from the frame clock received at its WSI pin, and then generate Divided_SCK again according to this new inner frame pulse, where Divided_SCK may be synchronized with the inner frame pulse or may be delayed from the inner frame pulse by a predetermined number of SCK cycles). In this way, the slave device is re-synchronized with the frame clock from the controller and begins to generate its inner frame clock again by counting the SCK number established during the SCK-counting stage.

Figure 23A:
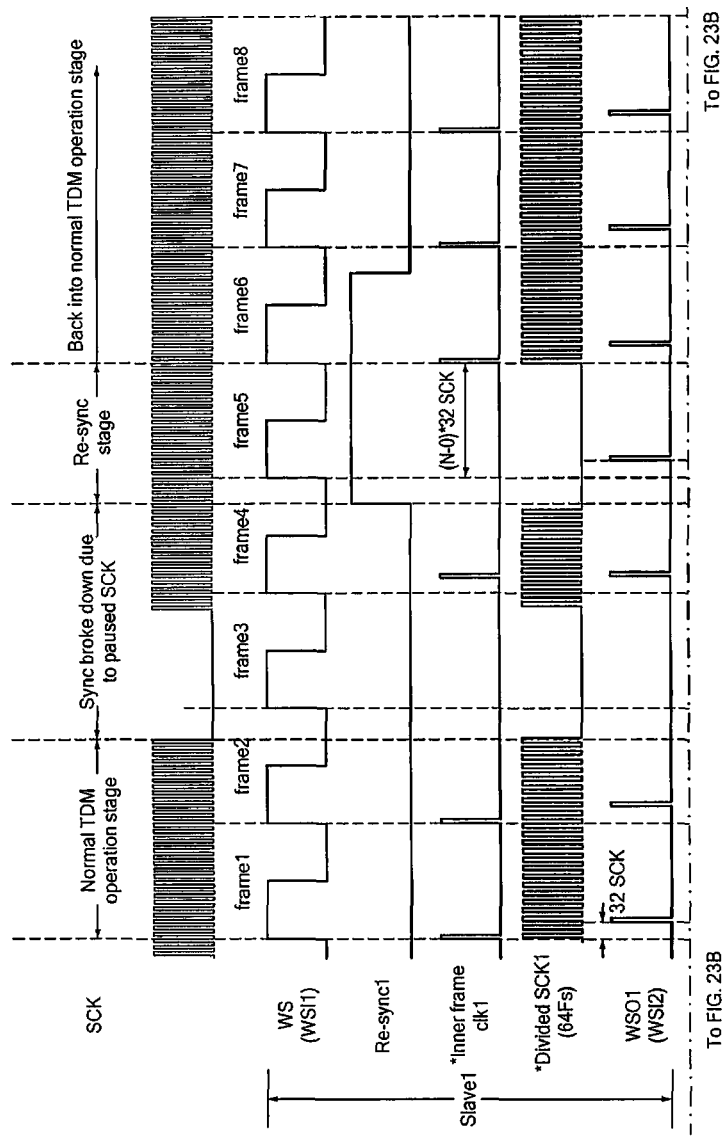
FIG. 23 schematically shows a re-synchronization sequence for the TDM daisy-chain, in accordance with an exemplary embodiment of the present invention.
Figure 23B:
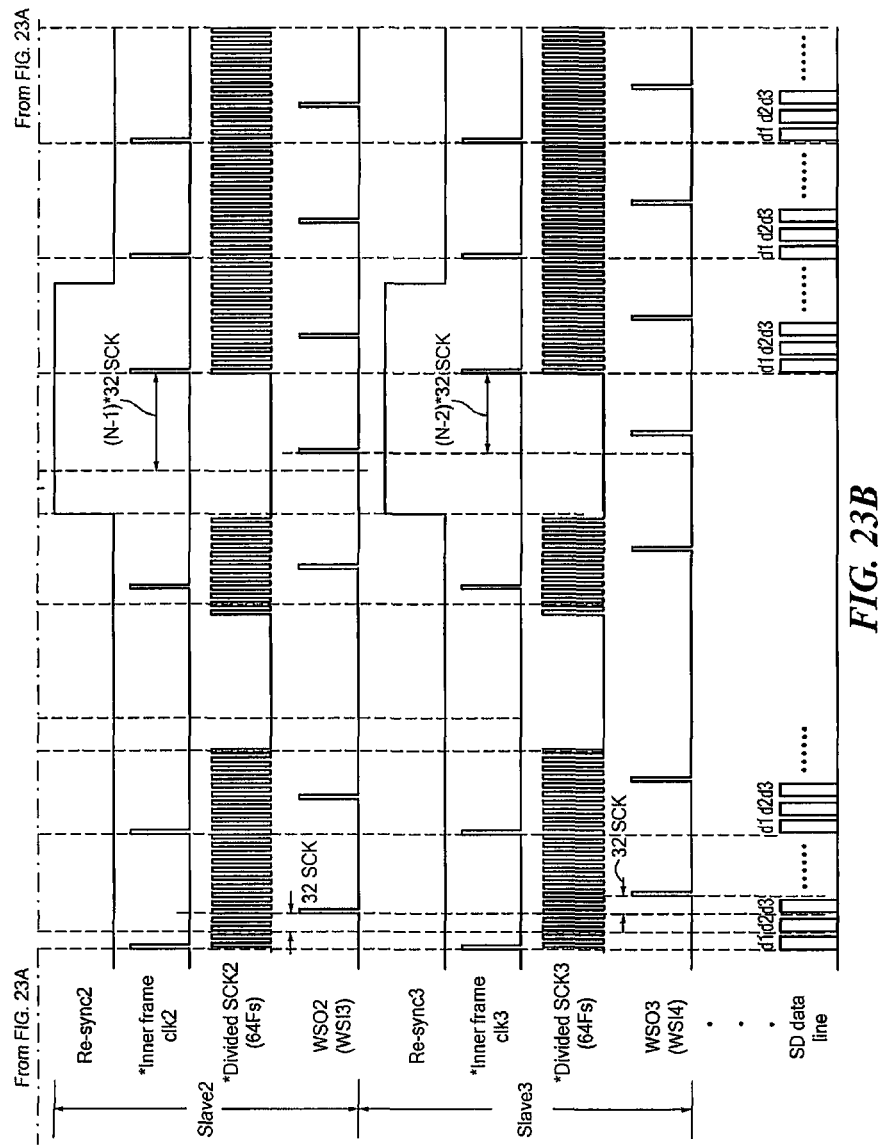

The controller may re-synchronize more than one slave devices in the chain, e.g., by sending a separate re-synchronization command to each of those slave devices or alternatively by applying a common re-synchronization command to all slave devices at the same time to force them to re-synchronize with the given frame clock from the controller. FIG. 23 schematically shows a re-synchronization sequence for the TDM daisy-chain, in accordance with an exemplary embodiment of the present invention. In this exemplary scenario, synchronization was lost because the controller stopped generating the SCK clock during frame 2 and frame 3. Due to this SCK pause, the inner frame clocks as well as the Divided_SCK are no longer synchronized with the external frame clock, i.e. the synchronization states for all slave devices are destroyed, and the output data is unreliable. In order to re-synchronize the slave devices, the controller sends re-synchronization signals to all slave devices during frame 4. So, starting from frame 5, with the stored location information K and the WSI input, which is one timeslot later than the previous slave device, the inner frame clock is re-generated to be synchronous with the frame clock from the controller as described above. As a result, the Divided_SCK is once again synchronized with the controller's frame clock, which in this example starts at the rising edge of inner frame clock pulse. From frame 6, all the slave devices are back into normal TDM operation.

Such a re-synchronization method may be used to re-synchronize any slave device as long as it receives a re-synchronization signal and operation clocks for the TDM chain. Little time (one frame time) and few operations are needed for this re-synchronization mechanism.

It should be noted that the information gathered during initialization, such as the value K, generally must be uncorrupted in order to re-synchronize using the described re-synchronization process. Thus, for example, if a slave device were to unexpectedly reset or otherwise become corrupted, the entire chain may need to be restarted.

It also should be noted that the value K computed by each slave device could be used for other functions.

For one example, the value K may be used as the basis for providing a unique address to each slave device, e.g., for communications between the controller and the slave device. For example, the address of each slave device could be set to K or to (base address+K) or to (base address+L*K) where L is an integer, where the base address (BAddr0) initially is a predetermined base address that may be hardwired or otherwise set to a default value when the slave device is reset, and may be the same for all slave devices on the bus. BAddr0 could be, for example, an internally hardwired address or an arbitrary programmable address that is located in a programmable base address register (BAR). A programmable base address could be set individually or could be set simultaneously for all the slave devices. Note that before the devices have individual device addresses, the BAR of each slave device typically would have the same value.

For another example, the value K (if known by the slave devices a priori) could be used to generate the internal operational clock without going through the synchronization process described above, by simply generating the internal operation clock starting after (N−K+1)×B cycles of SCK.

Slave Device Addressing

In certain applications, it may be necessary or desirable to individually configure the various (otherwise identical) slave devices in the daisy-chain. Examples of different control information that one may want to send to the various devices are signal gain, power state and delay time (for example, for a microphone array system). An example of a common control bus is the I2C bus. In order to communicate separately to each device on such a bus, each device typically requires a unique device address. Usually the devices are designed with different device addresses or they could be programmed to different addresses by using (static) external pins. However these methods generally would increase the cost and area of the devices as well as the system.

Even though the methods are presented here in the context of a TDM bus, it is not strictly required in all cases. In other words, the address assignment methods presented here can be used in non-TDM systems as well. For example, one would normally need 5 address pins to allow one to build a system with 32 (2^5) individually addressable parts. Using the methods described here one can realize an arbitrary amount of different addresses by using no more than 3 pins. An advantage of using these methods in a TDM system of the type described above relies on the fact that the already existing three (WSI, SCK and WSO) TDM pins can be used for this address assignment.

As discussed above, following initialization of the slave devices for TDM operation and assuming that the chain is configured to allow controller-to-slave (outbound) communication, the controller may send addressing and/or other information to the slave devices over the SD line.

Alternatively, as discussed above, each slave device may automatically determine its relative position K in the daisy-chain, for example, as discussed above with references to FIGS. 22-23, and the value K may be used as a slave device address or to assign a slave device address. Such addressing may be performed without an express configuration of the slave devices by the controller.

Figure 24A:
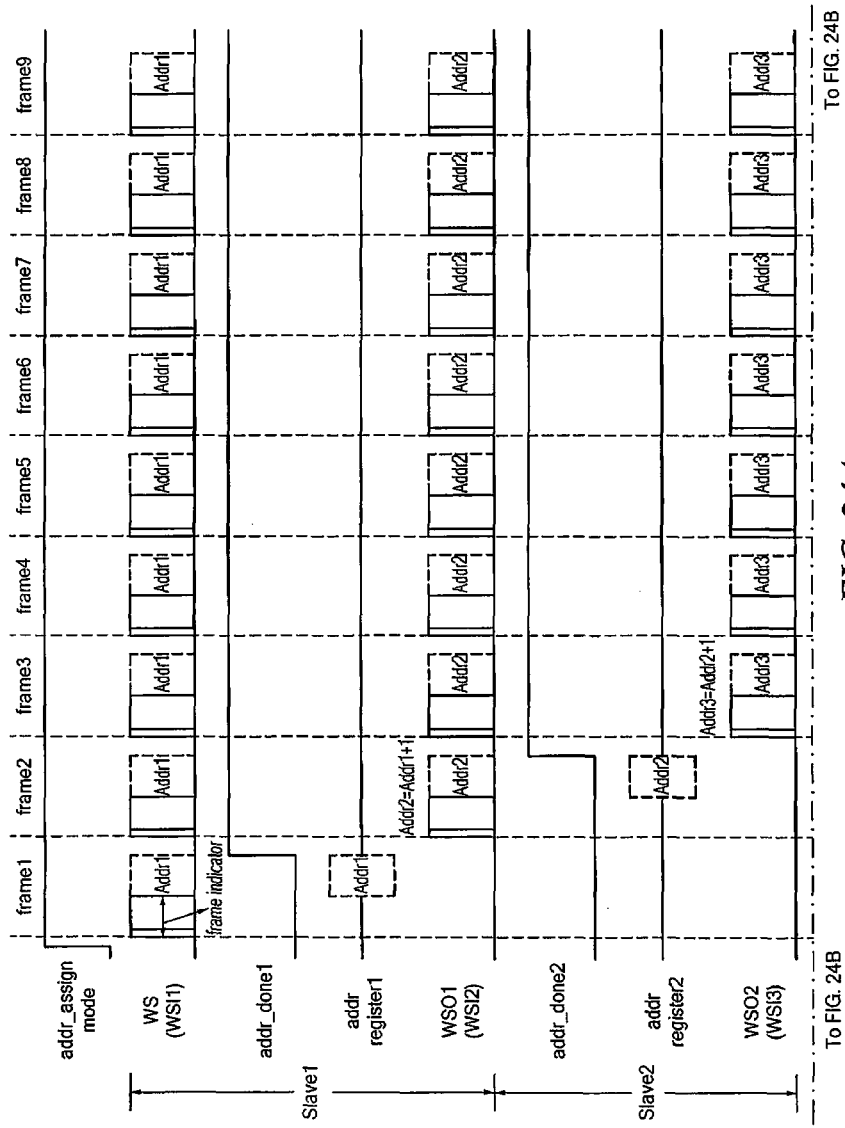
FIG. 24 schematically shows a timing diagram for configuring slave device addresses using the frame signal, in accordance with an exemplary embodiment of the present invention.
Figure 24B:
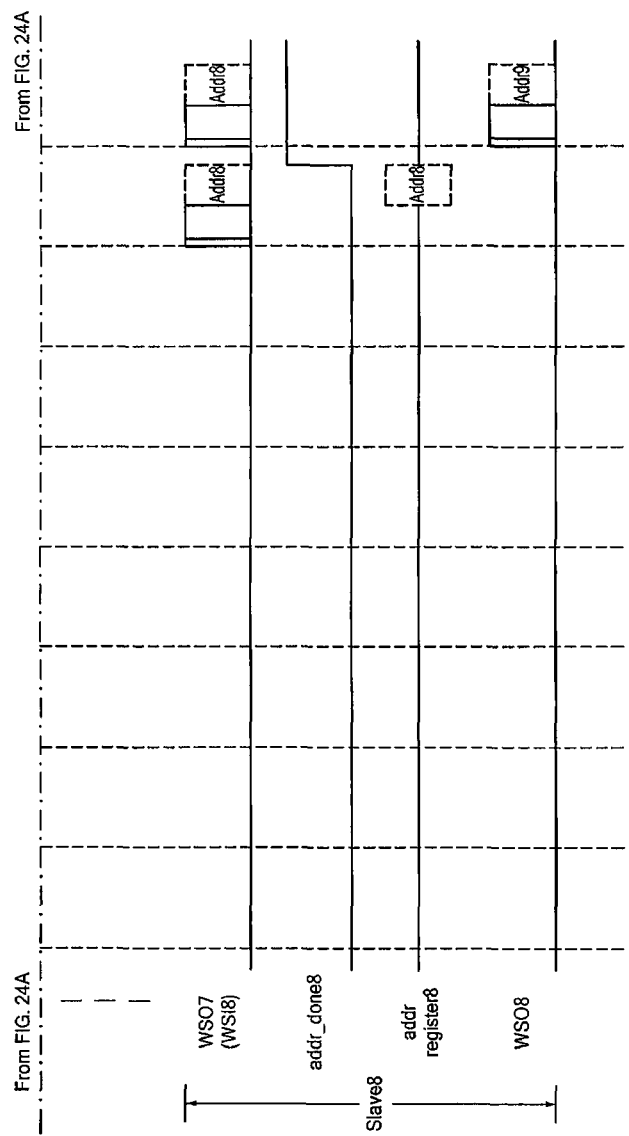

In another alternative embodiment, the frame signal (WSI/WSO) may be used to transfer not only a frame start indicator (which could be a pulse or special pre-defined sync-header) but also an address for the slave device. FIG. 24 schematically shows a timing diagram for configuring slave device addresses using the frame signal, in accordance with an exemplary embodiment of the present invention. In this example, the addr_assign_mode represents the state of an address assignment mode, which may be a signal from the controller (e.g., a hardware pin or other signal, such as a command sent over an I2C bus) or may be a mode that the slaves enter automatically, e.g., upon startup or upon some other event. Typically, the address assignment mode would operate prior to TDM bus initialization and/or device synchronization as discussed above. Also in this example, the addr_done signal is an internal signal that indicates the address assignment state of one slave device. When the addr_done signal is low, it means the address register of this slave device has not been updated, and when the address register has been configured, the addr_done signal turns to high and thereafter the address register typically could not be written again until the next address assignment mode.

The slave device addresses are configured as follows. Upon entering the address assignment mode (e.g., upon a signal generated by the controller), the controller transmits a frame start signal followed by a predetermined number of address bits representing the address for the first slave device in the chain (Addr1). Upon receiving the frame signal on its WSI pin, the slave device receives the address bits and stores the address in its address register. Also, the slave device produces a delayed frame signal on its WSO pin (e.g., delayed by B cycles of SCK) followed by a predetermined number of address bits representing the address for the second slave device in the chain (Addr2). Addr2 is typically equal to Addr1 plus a constant (e.g., Addr2=Addr1+1), although other addressing schemes may be employed. Each slave device similarly daisy-chains the frame/address signal so that each successive slave device is assigned a unique address. Upon completion of the address assignment mode (e.g., after a predetermined number of SCK cycles), address assignment mode is disabled, and the daisy-chain may be placed into TDM initialization and/or synchronization, e.g., signaled by a chip enable signal or activated in another way).

It should be noted that the address information passed along the WS line need not be a full slave device address. For example, slave device addresses may be 7-bit addresses comprises of a base address portion (e.g., 3 most-significant bits) and a programmable address portion (e.g., 4 least-significant bits), in which case only the programmable address portion needs to be conveyed from device to device, while the base address portion may be fixed and/or programmable as discussed above.

In yet another alternative embodiment, rather than using the WS (frame sync) pin to pass the address from one slave device to the next, the SD pin may be used to convey addresses to the slave devices during the address assignment mode (assuming the SD pin is configured as an input/output pin on the various devices). Here, upon entering the address assignment mode (e.g., upon a signal from the controller), the controller could simply generate the frame sync signal on the WS line and transmit an address in each time slot, and using the daisy-chained WS signal with delay as in TDM operation mode, each slave device could then receive its respective address off of the SD line during its designated time slot. The TDM bus would be designed to be off limits for regular data transfer until the addressing phase has completed.

Figure 25:
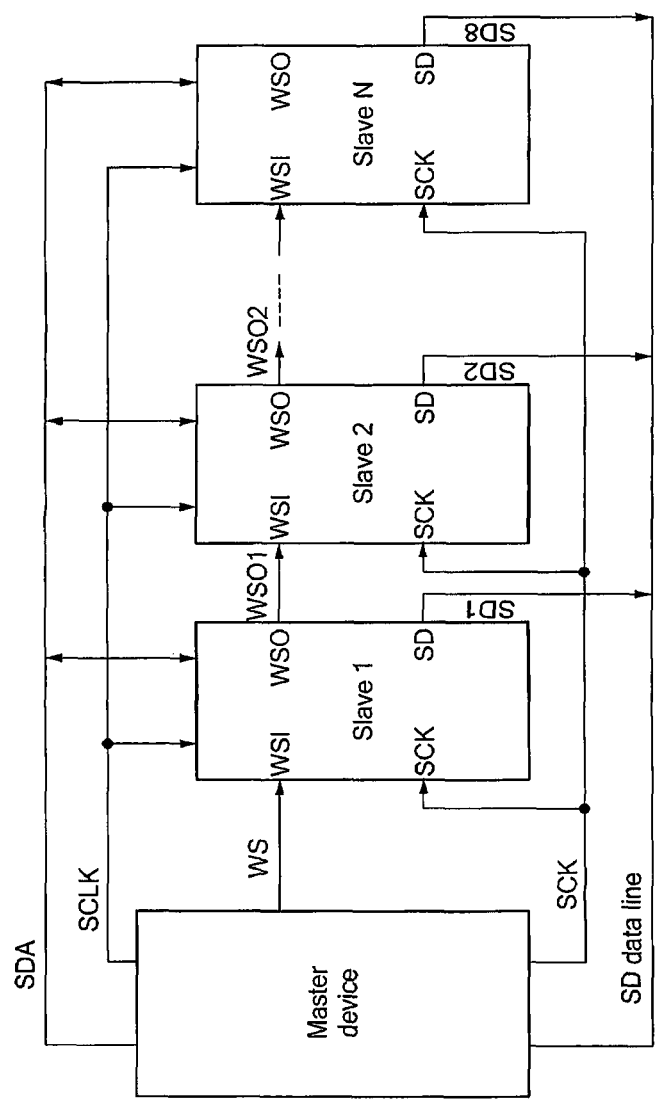
FIG. 25 schematically shows a daisy-chain configuration of the type discussed above, but further including an I2C bus (i.e., SDA and SCLK lines)

In yet another alternative embodiment, a signaling scheme similar to the one immediately above may be used to coordinate address assignment over an I2C bus or other bus. FIG. 25 schematically shows a daisy-chain configuration of the type discussed above, but further including an I2C bus (i.e., SDA and SCLK lines). In such an embodiment, each device typically has an individual address register (IAR) whose contents determine the individual device address. To enable each part to have a unique device address, each part has to receive a unique address into its IAR register, but the IAR has the same I2C address for all slave devices, so the daisy-chained WS signal is used to selectively activate each successive slave device for address assignment by the controller. Thus, even though all slaves devices will receive all I2C address assignment commands, only one slave device at a time will recognize a write to the IAR during the address assign mode. For each address assignment made by the controller over the I2C bus, the only slave device that will recognize the write to IAR will be the part that:

1) has received an active WSI input after entering the address assign mode; but 2) has not received a write to its IAR register since entering the address assign mode, i.e., its addr_done signal is low.

When a particular slave device has received a valid IAR write, it enables its WSO output and therefore sets up the next part in the chain to receive an IAR update. Thus, a set of signals (e.g., WSI, WSO) is used as an input and an output, where the input (WSI) tells the part when it should look at the I2C bus for an update to its IAR, and it uses the output (WSO) to tell the next part in the chain that its turn has come for an IAR update. This way, only one part at a time recognizes an IAR update from the I2C bus.

Figure 26B:
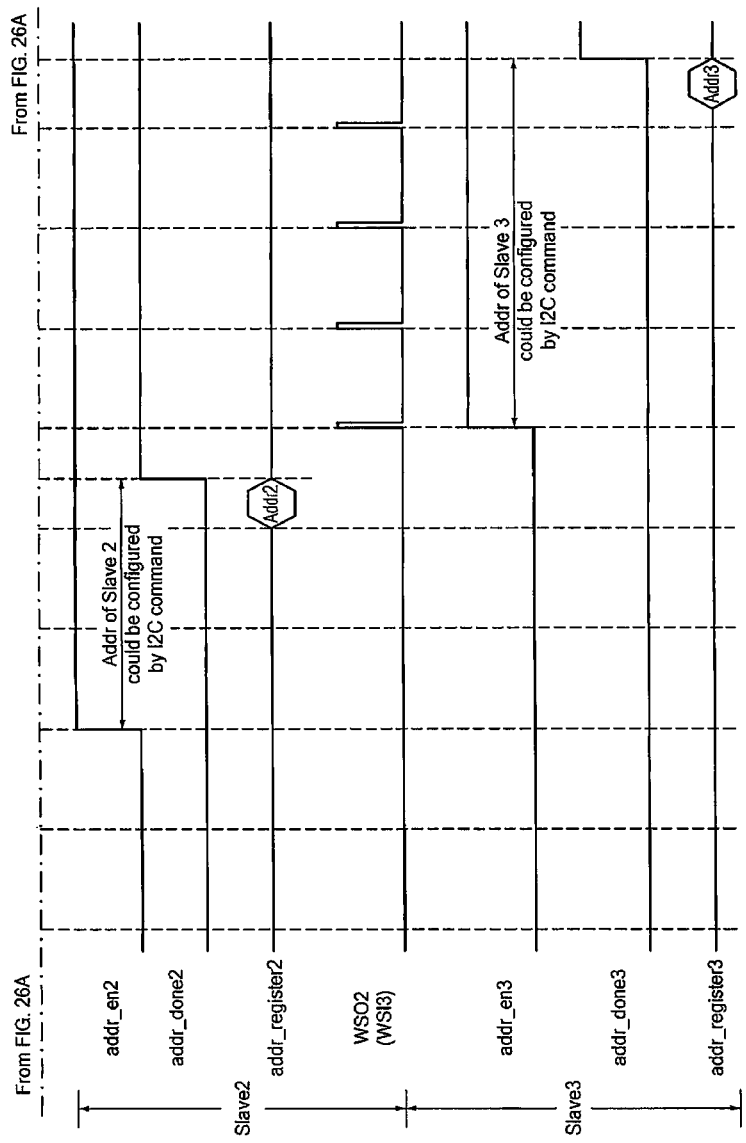
FIG. 26 schematically shows a timing diagram for configuring successive slave device addresses over the I2C bus, in accordance with an exemplary embodiment of the present invention.

FIG. 26 schematically shows a timing diagram for configuring successive slave device addresses over the I2C bus, in accordance with an exemplary embodiment of the present invention. Here, when the controller begins generating the frame sync signal on the WS line, the first slave device in the chain is activated for address assignment over the I2C bus, and the first slave device does not pass the WS signal to its WSO pin unless and until it has been assigned an address and/or other information from the controller via the I2C bus (e.g., other configuration functions may be performed during this address assignment mode, and the controller may use a specific command over the I2C bus to signal the end of the configuration phase for the slave device being configured). After the first slave device has been configured, it begins passing the WS signal through to its WSO pin, either with or without delay, thereby activating the next slave device for address assignment. Each successive slave device similarly awaits configuration via the I2C bus before passing the WS signal on to its WSO pin.

Figure 27A:
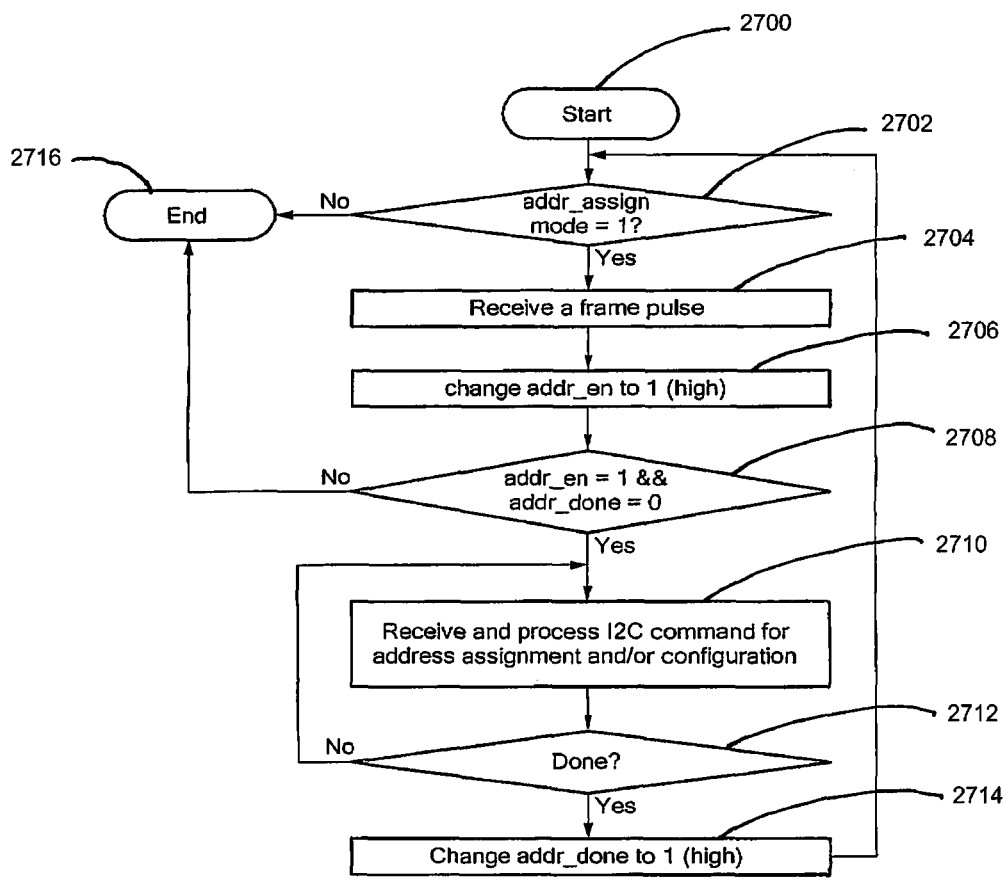
FIG. 27A schematically shows a flow chart for a slave device address assignment mode of the type depicted in FIG. 26, in accordance with an exemplary embodiment of the present invention.

FIG. 27A schematically shows a flow chart for this slave device address assignment mode, in accordance with an exemplary embodiment of the present invention. Specifically, after Start, at 2700, during address assignment mode (i.e., addr_assign_mode=1) 2702, as long as the slave device has received a frame pulse (addr_en turns to high at the rising edge of the pulse), at 2704, and its addr_done is low, at 2706, the slave device processes I2C command(s), at 2708, that write its address register (and/or other configuration information), at 2710. When configuration is complete (e.g., upon the writing of the address register, or upon another predetermined signal, such as an express signal that configuration is complete) at 2712, the addr_done indicator is set to high, at 2714, to indicate that this slave has been configured. The addr_done indicator may be maintained in a memory, e.g., for use in later confirming that the slave had been properly configured (e.g., if, after the slave devices are taken out of addr_assign mode, the addr_done indicator is low, which indicates that configuration had not been completed, at 2716, the slave device may generate an error signal or this condition may be otherwise detected by the controller, e.g., by having each slave report the status of its addr_done indicator).

One variant would use an addr_assign mode signal that is internal to each part that could be asserted by chip power-on-reset and deasserted by the chip after receiving a valid IAR update.

Figure 27B:
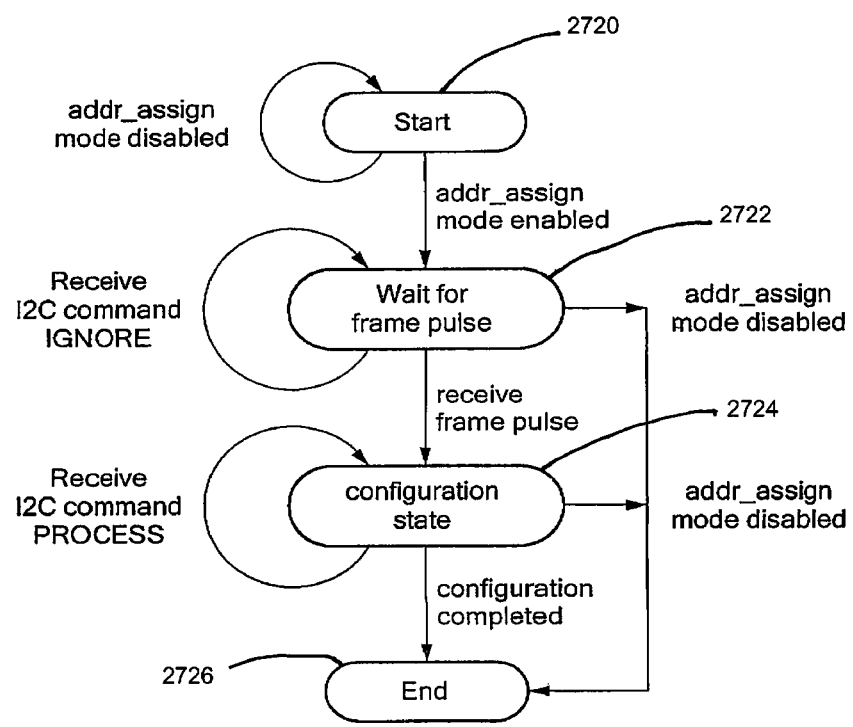
FIG. 27B schematically shows a state transition diagram for a slave device address assignment mode of the type depicted in FIG. 27A, in accordance with an exemplary embodiment of the present invention.

FIG. 27B schematically shows a state transition diagram for a slave device address assignment mode of the type depicted in FIG. 27A, in accordance with an exemplary embodiment of the present invention. Beginning in the Start state, at 2720, the logic transitions, at 2722, to the Wait for Frame Pulse state upon detecting that address assign mode has been enabled. In the Wait for Frame Pulse state, the logic ignores any I2C commands that are received over the I2C bus. Upon receipt of a frame pulse, the logic transitions to the Configuration state, at 2724, in which the logic processes at least one I2C command received over the I2C bus (e.g., configuration may be complete upon receipt of a single 12C command that writes to the slave device address register, or configuration may be complete upon some other event such as an explicit indication provided by the controller). When configuration is completed, the logic transitions to the End state, at 2726. If the address assignment mode is disabled while the logic is in the Wait for Frame Pulse state or the Configuration state, then the logic transitions to the End state, essentially left in an unconfigured state. While in the Configuration state, the logic essentially ignores any received frame pulses, i.e., frame pulses do not cause a state transition in this example.

Note that in most cases all registers in a particular chip would be affected by the individual addressing schemes described herein. However there may be cases where one would like to be able to change some registers of all slave devices to the same value at the same time. Such registers may be for example for system power down and the register for the address assign mode control which will be mentioned later of this document. So it may therefore be of interest to have some common control register addresses be unaffected by the individual addressing schemes described in this document. This avoids one having to write these common controls to each device separately. To achieve this, one slave device could be designed with two device addresses. One device address (command device address, CAddr) would always be the same for all the slave devices, allowing the host controller to simultaneously change common control registers in all devices to the same value with one write operation. The other device address (individual device address, IAddr) could be manufactured to default to same base address (BAddr0) for all the slave devices but then it could be configured to a unique address for each device with the virtual device address assignment methods described herein.

Serialized Signal Processing

In various microphone examples described above, each microphone transmitted an audio sample in each frame, such that the controller generally would receive one sample from each microphone per frame. The controller would then process the received samples.

Figure 28:
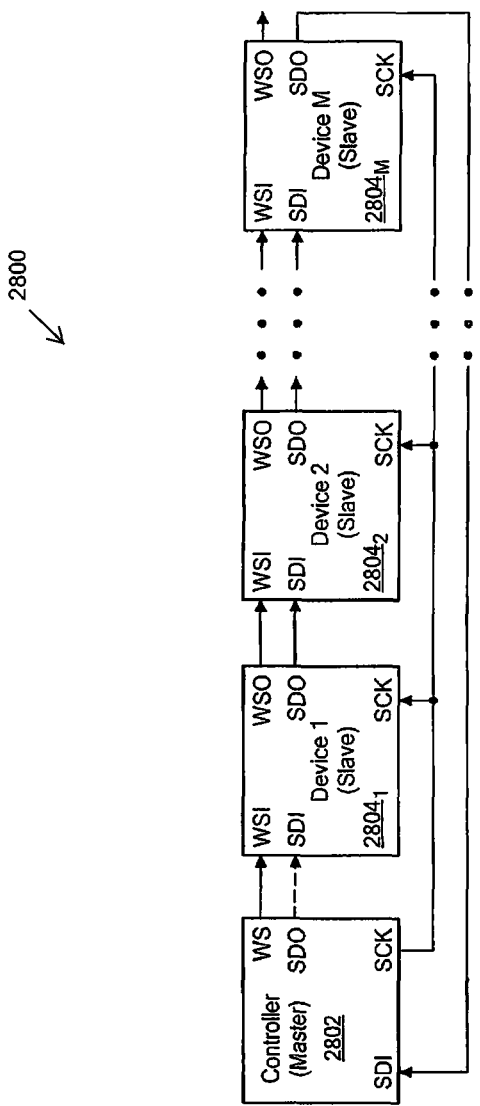
FIG. 28 schematically shows a daisy-chaining configuration for producing an aggregate output, in accordance with an exemplary embodiment of the present invention.

Alternatively, the multiple slave devices may be configured and operated so as to produce a single aggregate (e.g., beamformed) output per frame. FIG. 28 schematically shows a daisy-chaining configuration 2800 for producing an aggregate output, in accordance with an exemplary embodiment of the present invention. Here, rather than having the slave devices transmit onto the SD line in a TDM fashion as described above, the SD outputs are daisy-chained from one slave device to the next. Thus, each slave device has an SD input pin (SDI) and an SD output pin (SDO). Each slave device may then combine the data received from its predecessor with its own data (e.g., produce a sum of the data) or otherwise process the data received from the predecessor device and combine with its own processed data and pass a single (e.g., combined) output to its SD output. Using the type of WS daisy-chaining and synchronization techniques described above, a microphone embodiment can be made to sample audio synchronously and to pass the SD output in a TDM fashion along the SD daisy chain to form a combined (e.g., beamformed) output for the controller, with the combined output provided to the controller via the SDO pin of the last slave device in the daisy-chain. While the SDI pin of the first slave-only device is shown in FIG. 28 as being optionally coupled to an SDO pin of the controller for bi-directional communications discussed below, when such bi-directional communication is not desired, the SDI pin of the first slave-only device generally would not be used, in which case it may be unconnected (floating) or may be connected, e.g., tied high, tied low, tied to ground, etc. as desired for a particular implementation.

Additionally, bi-directional communications between the controller and slave devices, and even between different slave devices, may be accomplished by coupling an optional SDO pin of the controller to the SDI pin of the first slave-only device, thereby forming a ring confirmation allowing the controller to send information (e.g., command and/or data) to the slave devices, receive data from the slave devices, and even transfer data from one slave device to another slave device (e.g., from a downstream slave device to an upstream slave device). Furthermore, in embodiments in which the slave devices are associated with individual addresses (e.g., as discussed above), controller-to-slave and/or slave-to-slave communications can be unicast using the individual device addresses or multicast/broadcast to multiple or all devices. Thus, for example, the controller may broadcast a command or data to all slave devices (e.g., a reset command) or may send a command or data to individual slave devices (e.g., providing configuration information, requesting status information, etc.). In turn, the slave devices can selectively process data received from an upstream device depending on, for example, the type of data, the source of the data, or the intended destination of the data. For example, a slave-only device may perform serialized signal processing on some data while passing other data through, thereby allowing different types of data to be conveyed on the bus.

Miscellaneous

It should be noted that, while certain examples are described above with reference to time slot intervals of 32 SCK cycles, the present invention is not limited to time slot intervals of 32 SCK cycles and is not limited to any particular time slot interval. For example, embodiments can be configured with lower resolutions (e.g., 8 clocks or 16 clocks per time slot) or higher resolutions (e.g., 64 clocks per time slot), with the various clock signals (e.g., WS, internal operational clock) scaled accordingly.

It should be noted that headings are used above for convenience and are not to be construed as limiting the present invention in any way.

Various aspects of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application.

Without limitation, potential subject matter that may be claimed (prefaced with the letter "P" so as to avoid confusion with the actual claims presented below) includes:

P25. A method of generating an internal operational clock for a device at a position K in a daisy-chain for operation in a TDM communication system having N time slots per frame, the method comprising:
  receiving a serial clock signal;
  receiving a frame clock signal; and
  generating the internal operational clock after a predetermined number of cycles of the serial clock signal, wherein the predetermined number is based on K and N.

P26. A method according to claim P25, wherein the predetermined number is equal to (N−K+1)*B, where B is a predetermined constant.

P27. A method according to claim P25, further comprising:
  dynamically determining the value N by counting the number of cycles of serial clock signal between frame clock signals.

P28. A method according to claim P25, wherein at least one of:
- the value K is hardwired into the device;
- the value K is programmed into the device; or
- the value K is determined dynamically by the device.

Re-Synchronization

P29. A method of re-synchronizing an internal operational clock of a device at a position K in a daisy-chain for operation in a TDM communication system having N time slots per frame, the method comprising:
- receiving a serial clock signal;
- receiving a frame clock signal;
- generating the internal operational clock signal synchronized to an external reference clock signal;
- determining the value K based on the difference between the internal operational clock signal and the frame clock signal;
- receiving a re-synchronization signal; and
- generating the internal operational clock after a predetermined number of cycles of the serial clock signal, wherein the predetermined number is based on K and N.

P30. A method according to claim P29, wherein the predetermined number is equal to (N−K+1)*B, where B is a predetermined constant.

P31. A method according to claim P29, wherein N is determined dynamically by counting the number of cycles of serial clock signal between frame clock signals.

Addressing Based on Relative Position

P32. A method of automatically assigning addresses to daisy-chained devices, the method comprising, by each device:
- automatically determining the relative position of the device in the daisy-chain based on the difference between two clock signals; and
- assigning a device address based on the relative position.

P33. A method according to claim P32, wherein automatically determining the relative position of the device in the daisy-chain based on the difference between two clock signals comprises:
- generating a first clock signal synchronized to a reference clock signal;
- receiving a second clock signal;
- determining an amount of delay between the second clock signal and the first clock signal; and
- determining the relative position based on the amount of delay.

P34. A method according to claim P33, wherein determining an amount of delay between the second clock signal and the first clock signal comprises:
- receiving a third clock signal;
- counting the number of cycles (N) of the third clock signal between the first clock signal and the second clock signal.

P35. A method according to claim P34, wherein the number of cycles (N) is a multiple of a predetermined constant (B), and wherein the relative position K=N/B+1.

P36. A method of automatically determining the relative position of a device in a daisy-chain, the method comprising:
- generating a first clock signal synchronized to a reference clock signal;
- receiving a second clock signal;
- determining an amount of delay between the second clock signal and the first clock signal; and
- determining the relative position based on the amount of delay.

P37. A method according to claim P36, wherein determining an amount of delay between the second clock signal and the first clock signal comprises:
- receiving a third clock signal;
- counting the number of cycles (N) of the third clock signal between the first clock signal and the second clock signal.

P38. A method according to claim P37, wherein the number of cycles (N) is a multiple of a predetermined constant (B), and wherein the relative position K=N/B+1.

Addressing Based on Other Factors

P39. A method of assigning addresses to slave devices in a daisy-chain, the method comprising:
- a controller transmitting a frame start signal followed by an address value usable by a first slave device in the daisy-chain to assign itself an address; and
- each successive slave device in the daisy-chain receiving a frame start signal followed by an address value, storing an address in a memory of the slave device based on the address value, and generating a delayed frame start signal followed by an address value for the next slave device in the daisy-chain different than the address value received by the slave device.

P40. A method according to claim P39, wherein the next address value is equal to the received address value plus a predetermined constant.

P41. A method according to claim P39, wherein the address values are partial addresses for the slave devices.

P42. A method of assigning addresses to slave devices in a daisy-chain, the method comprising:
- a controller generating a frame sync signal on a frame sync pin and transmitting a unique address value in each of a plurality of successive time slots on a data line; and
- each successive slave device in the daisy-chain receiving a frame sync signal, reading an address value from a corresponding time slot on the data line, and passing a delayed frame sync signal to the next successive slave device in the daisy-chain.

P43. In a daisy-chain communication system having a controller in communication with at least one slave device, wherein each slave device is configured to receive a frame sync signal from the previous device in the daisy-chain on a frame sync input and to provide a frame sync signal on a frame sync output, and wherein the slave devices are in communication with the controller via a bus, a method of configuring a designated slave device, the method comprising, by the designated slave device:
- upon receipt of a frame sync signal on the frame sync input, determining whether or not configuration has already been performed and if not, entering a configuration mode in which at least one command received over the bus is executed by the designated slave device, and upon determining that configuration of the designated slave device is complete, terminating the configuration mode and providing a frame sync signal on the frame sync output, wherein the designated slave device ignores commands received over the bus prior to and following the configuration mode until configuration of all slave devices is complete.

Serialized Signal Processing

P44. A time-division multiplexed communication system comprising:
- a controller including a clock output for providing a clock signal, a frame sync output for providing a frame sync signal indicating the beginning of each of a number of successive frames, and a data input; and
- a plurality of slave-only devices in communication with the controller, each slave-only device including a clock input coupled to the clock output of the controller for receiving the clock signal, a data input; a data output, a frame sync input, and a frame sync output, the controller and the at least one slave-only device interconnected in a chain configuration beginning with the controller, wherein (1) the frame sync input of each slave-only device is coupled to the frame sync output of the previous device in the chain and (2) the data output of the last slave-only device is coupled to the data input of the controller and the data output of each remaining slave-only device is coupled to the data input of the subsequent slave-only device in the chain, wherein the controller provides the frame sync signal on the frame sync output and during a data passing mode each slave-only device provides a delayed frame sync signal to the next successive slave-only device in the chain via the frame sync output and each slave-only device transmits data on its data output in a predetermined number of time slots based on the frame sync signal received on the frame sync input, wherein the data transmitted on the data output by at least one slave-only device includes a combination of data received on the data input and data generated internally by the slave-only device.

P45. A system according to claim P44, wherein each slave-only device is configured to perform an auto-initialization process including:

in a first stage triggered by receipt of a predetermined signal on the frame sync input, counting the number of clock signal cycles per frame and generating an inner frame clock aligned to the frame sync signal;

in a second stage, outputting the inner frame clock on the frame sync output; and in a third stage, operating in the data passing mode.

P46. A system according to claim P45, wherein at least one of the slave-only devices includes an analog-to-digital transducer configured to operate based on the inner frame clock.

P47. A system according to claim P46, wherein the analog-to-digital transducer is a microphone that produce digital audio samples.

P48. A system according to claim P44, wherein the plurality of slave-only devices are integrated onto a single chip.

P49. A system according to claim P48, wherein the controller is integrated with the plurality of slave-only devices onto the single chip.

Miscellaneous Claims

P50. Any of the above systems, devices, and method in which information transmitted on the data line may include command/control information along with data (e.g., from an analog-to-digital or digital-to-analog converters) in one or both directions.

P51. Systems, devices, and methods comprising any practical combination of the described synchronization, re-synchronization, address assignment, and/or serialized data processing.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A time-division multiplexed communication system comprising:

a data line;

a controller including a clock output for providing a clock signal, a frame sync output for providing a frame sync signal indicating the beginning of each of a number of successive frames, and a data pin coupled to the data line; and at least one slave-only device in communication with the controller, each slave-only device including a clock input coupled to the clock output of the controller for receiving the clock signal, a data pin coupled to the data line, a frame sync input, and a frame sync output, the controller and the at least one slave-only device interconnected in a chain configuration beginning with the controller, wherein the frame sync output of the controller is coupled to the frame sync input of one of the slave-only devices, further wherein the frame sync input of each slave-only device, except the one of the slave-only device, is coupled to the frame sync output of the previous slave-only device in the chain and the frame sync output of the one of slave-only device is coupled to the frame sync input of the next slave-only device in the chain, and wherein the controller provides the frame sync signal on its frame sync output, wherein each slave-only device is configured to perform an auto-initialization process including:

monitoring the frame sync input for frame sync signals; and after receiving at least two frame sync signals on the frame sync input:

generating an inner frame clock based on a plurality of the received frame sync signals, the inner frame clock synchronized with the frame sync signal provided on the controller frame sync output;

outputting the inner frame clock on the frame sync output; and entering a data passing mode, including generating an internal operational clock based on the inner frame clock.

2. A system according to claim 1, wherein generating the inner frame clock comprises determining the number of clock signal cycles in a frame based on the clock signal and the plurality of frame sync signals, and wherein generating the internal operational clock comprises generating the internal operational clock based on the inner frame clock and the number of clock signal cycles in a frame.

3. A system according to claim 1, wherein the at least one slave-only device comprises a plurality of slave-only devices, and wherein all of the slave-only devices are configured to access the same number of time slots per frame.

4. A system according to claim 1, wherein the at least one slave-only device comprises a plurality of slave-only devices, and wherein at least two slave-only devices are configured to access different numbers of time slots per frame.

5. A system according to claim 1, wherein the at least one slave-only device comprises a plurality of slave-only devices, and wherein all of the slave-only devices are the same type of device.

6. A system according to claim 1, wherein the at least one slave-only device comprises a plurality of slave-only devices, and wherein at least two slave-only devices are different types of devices.

7. A system according to claim 1, wherein each slave-only device is configured to determine a maximum number of slave-only devices supported by the controller based on the clock signal and the frame sync signal.

8. A system according to claim 7, wherein the data pin of each slave-only device includes a programmable driver, and wherein each slave-only device is configured to program a power setting of the programmable driver based on the maximum number of slave-only devices supported by the controller.

9. A system according to claim 1, wherein the data pin of each slave-only device is configured or configurable for at least one of:

transmitting data via the data line; or receiving data from the data line.

10. A system according to claim 1, wherein the at least one slave-only device includes at least one digital MEMS microphone device.

11. Apparatus comprising at least one slave-only device for operation in a time-division multiplexed communication system having a controller in communication with the at least one slave-only device, the apparatus comprising:
one of the at least one slave-only device having a first frame sync input for receiving a frame sync signal indicating the start of each of a number of successive frames from the controller, the at least one slave-only devices interconnected in a chain configuration beginning with the one of the at least one slave-only device and each of the at least one slave-only device except the one of the at least one slave-only device including,
a clock input for receiving a clock signal;
except for the one of the at least one slave-only device, a frame sync input for receiving a frame sync signal indicating the start of each of a number of successive frames;
a frame sync output for outputting a delayed frame sync signal, except for a last one of the one of the at least one slave-only device, the delayed frame sync signal being the frame sync signal of a subsequent one of the at least one slave-only device; and
a slave-only TDM bus interface coupled to the clock input, the frame sync input, and the frame sync output and including a data pin for coupling to a data line, wherein the TDM bus interface is configured to perform an auto-initialization process including:
monitoring the frame sync input for frame sync signals; and
after receiving at least two frame sync signals on the frame sync input:
generating an inner frame clock based on a plurality of the received frame sync signals, the inner frame clock synchronized with a frame sync signal provided on a controller frame sync output;
outputting the inner frame clock on the frame sync output; and
entering a data passing mode, including generating an internal operational clock based on the inner frame clock.

12. Apparatus according to claim 11, wherein the TDM bus interface is configured to determine the number of clock signal cycles in a frame based on the clock signal and the plurality of frame sync signals, and wherein the TDM bus interface is further configured to generate the internal operational clock based on the inner frame clock and the number of clock signal cycles in a frame.

13. Apparatus according to claim 12, wherein the TDM bus interface is further configured to determine a maximum number of slave-only devices that can be supported in a chain based on the clock signal and the frame sync signal received on the frame sync input.

14. Apparatus according to claim 13, wherein the data pin includes a programmable driver, and wherein the TDM bus interface is further configured to program a power setting of the programmable driver based on the maximum number of slave-only devices.

15. Apparatus according to claim 11, wherein the data pin is configured or configurable for at least one of:
transmitting data via the data line; or
receiving data from the data line.

16. Apparatus according to claim 11, further comprising a digital MEMS microphone coupled to the slave-only TDM bus interface.

17. Apparatus according to claim 11, wherein the at least one slave-only device comprises a plurality of slave-only devices, and wherein the plurality of slave-only devices are integrated onto a single chip.

18. Apparatus according to claim 17, further comprising the controller integrated with the plurality of slave-only devices onto the single chip.

19. A method for automatically initializing a slave-only device in a time-division multiplexed communication system having a controller in communication with at least one slave-only device, wherein data is transmitted in successive frames, each frame including a predetermined number of time slots, the method comprising:
monitoring, by a TDM interface of the slave-only device, a frame sync input of the slave-only device for frame sync signals; and
after receiving at least two frame sync signals on the frame sync input:
generating an inner frame clock for the slave-only device based on a plurality of the received frame sync signals, the inner frame clock synchronized with a frame sync signal output by the controller, the generating including;
receiving a clock signal from the controller via a clock input of the slave device;
determining the number of clock signal cycles in a frame based on clock signal and the plurality of frame sync signals; and
generating the internal operational clock based on the inner frame clock and the number of clock signal cycles in a frame;
outputting the inner frame clock on a frame sync output of the slave-only device;
entering a data passing mode, including generating an internal operational clock for the slave-only device based on the inner frame clock; and
determining a maximum number of slave-only devices based on the clock signal and the frame sync signal.

20. The method according to claim 19, wherein the slave-only device includes a programmable driver for the data output, and wherein the method further comprises:
programming the programmable driver based on the maximum number of slave-only devices.

21. A method according to claim 19, wherein the slave-only device includes an analog-to-digital transducer or digital-to-analog transducer, and wherein the method further comprises:
providing the internal frame clock to the transducer.

22. A method according to claim 21, wherein the transducer is a microphone that produces digital audio samples.

23. A time-division multiplexed communication system comprising:
a data line;
a controller including a clock output for providing a clock signal, a frame sync output for providing a frame sync signal indicating the beginning of each of a number of successive frames, and a data pin coupled to the data line; and
at least one slave-only device in communication with the controller, each slave-only device including a clock input coupled to the clock output of the controller for receiving the clock signal, a data pin coupled to the data line, a frame sync input, and a frame sync output, the controller and the at least one slave-only device interconnected in a chain configuration beginning with the controller, wherein the frame sync input of each slave-only device is coupled to the frame sync output of the previous device in the chain, and wherein the controller provides the frame sync signal on its frame sync output, wherein each slave-only device is configured to perform an auto-initialization process including:

monitoring the frame sync input for frame sync signals; and after receiving at least two frame sync signals on the frame sync input:

generating an inner frame clock based on a plurality of the received frame sync signals, the inner frame clock synchronized with the frame sync signal provided on the controller frame sync output;

outputting the inner frame clock on the frame sync output; and entering a data passing mode, including generating an internal operational clock based on the inner frame clock, wherein each slave-only device is configured to determine a maximum number of slave-only devices supported by the controller based on the clock signal and the frame sync signal.

\* \* \* \* \*